(12) United States Patent
Sako et al.

(10) Patent No.: US 8,275,302 B2
(45) Date of Patent: Sep. 25, 2012

(54) BLADE FOR ELECTROPHOTOGRAPHIC DEVICE WITH ELASTIC RUBBER MEMBER CONSTITUTED BY EDGE/NIP AND BASE PORTIONS OF DIFFERENT MATERIALS

(75) Inventors: Yasuhiro Sako, Kobe (JP); Ken Hirotomi, Kobe (JP); Nariaki Iwasaki, Kobe (JP)

(73) Assignee: Bando Chemical Industries, Ltd., Kobe-shi (JP)

( * ) Notice: Subject to any disclaimer, the term of this patent is extended or adjusted under 35 U.S.C. 154(b) by 535 days.

(21) Appl. No.: 12/524,712

(22) PCT Filed: Jan. 16, 2008

(86) PCT No.: PCT/JP2008/050390
§ 371 (c)(1),
(2), (4) Date: Sep. 23, 2009

(87) PCT Pub. No.: WO2008/093536
PCT Pub. Date: Aug. 7, 2008

(65) Prior Publication Data
US 2010/0008707 A1 Jan. 14, 2010

(30) Foreign Application Priority Data
Jan. 29, 2007 (JP) ................. 2007-018162

(51) Int. Cl.
*G03G 21/00* (2006.01)
*G03G 15/08* (2006.01)

(52) U.S. Cl. ........ 399/350; 399/273; 399/274; 399/283; 399/284

(58) Field of Classification Search .......... 399/273, 399/274, 283, 284, 350; 15/256.5
See application file for complete search history.

(56) References Cited

U.S. PATENT DOCUMENTS

| | | | | |
|---|---|---|---|---|
| 4,978,999 A | * | 12/1990 | Frankel et al. | 399/350 |
| 5,040,030 A | * | 8/1991 | Ziegelmuller | 399/350 |
| 6,606,474 B2 | * | 8/2003 | Sirejacob | 399/274 |
| 6,909,869 B2 | * | 6/2005 | Yamamoto et al. | 399/284 |
| 2001/0004426 A1 | * | 6/2001 | Sato | 399/350 |
| 2006/0193663 A1 | * | 8/2006 | Lundy et al. | 399/350 |

FOREIGN PATENT DOCUMENTS

| | | |
|---|---|---|
| JP | 60-165682 | 8/1985 |
| JP | 04-118035 | 4/1992 |
| JP | 06-180543 | 6/1994 |
| JP | 07-334060 | 12/1995 |
| JP | 08-292694 | 11/1996 |
| JP | 09-127846 | 5/1997 |
| JP | 09-141761 | 6/1997 |
| JP | 09-274416 | 10/1997 |
| JP | 10-312109 | 11/1998 |

(Continued)

*Primary Examiner* — Susan Lee
(74) *Attorney, Agent, or Firm* — Knobbe Martens Olson & Bear LLP

(57) ABSTRACT

A blade for an electro-photographic device includes an elastic rubber member constituted by an edge portion and a base portion which are in contact with each other and are constituted by different materials, wherein the edge portion includes an edge subject to frictional wear in use and is made of ester polyurethane, and the base portion is adapted to be bonded to a support and is made of ether polyurethane. The blade undergoes minimal permanent deformation and offers excellent mechanical strength, wear resistance and compliance to the use environment.

17 Claims, 15 Drawing Sheets

FOREIGN PATENT DOCUMENTS

| | | |
|---|---|---|
| JP | 11-212414 | 8/1999 |
| JP | 2000-235337 | 8/2000 |
| JP | 2001-051499 | 2/2001 |
| JP | 2001-356566 | 12/2001 |
| JP | 2002-055582 | 2/2002 |
| JP | 2002-182535 A | 6/2002 |
| JP | 2002-214989 | 7/2002 |
| JP | 2002-214990 | 7/2002 |
| JP | 2003-145559 | 5/2003 |
| JP | 2004-046145 | 2/2004 |
| JP | 2004-184462 | 7/2004 |
| JP | 2004-199042 | 7/2004 |
| JP | 2004-233818 | 8/2004 |
| JP | 2005-007676 | 1/2005 |
| JP | 2006-301564 | 11/2006 |
| JP | 2007-003882 | 1/2007 |
| JP | 2007-030385 | 2/2007 |
| JP | 2007-163676 | 6/2007 |
| WO | WO 02052353 A1 * | 7/2002 |

* cited by examiner

[Fig. 1]
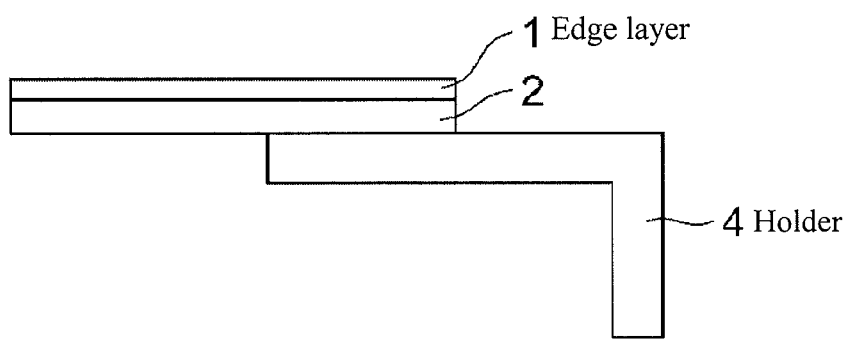

[Fig. 2]
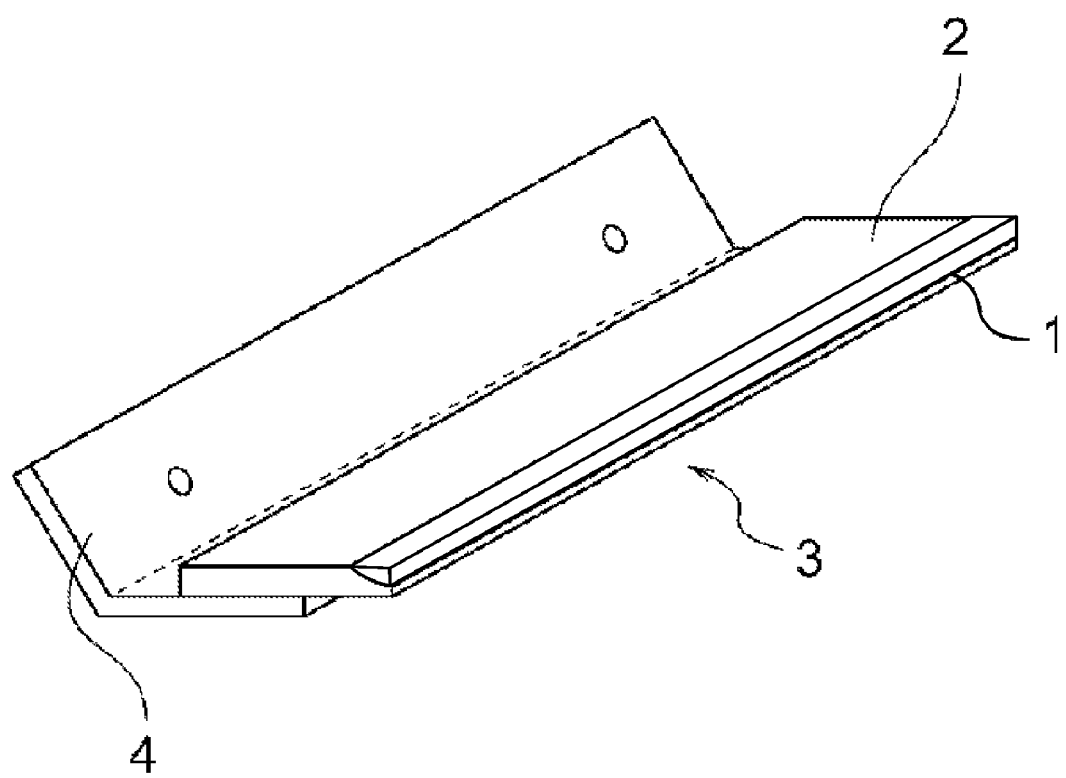

[Fig. 3]
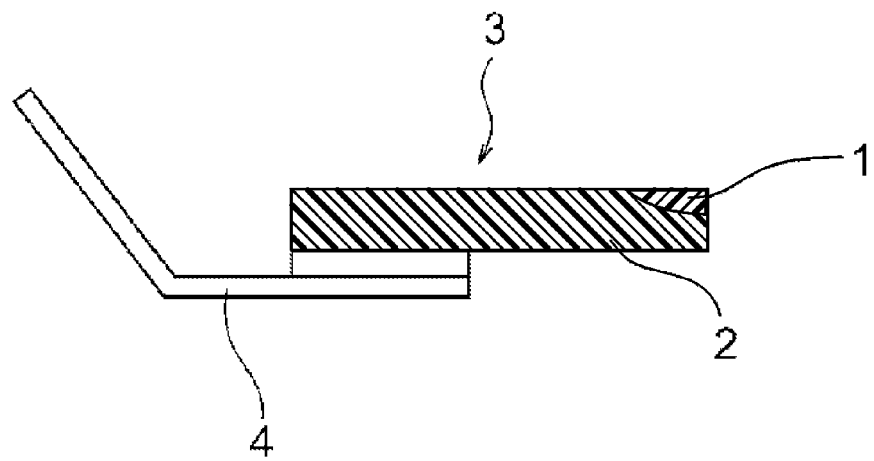
[Fig. 4]
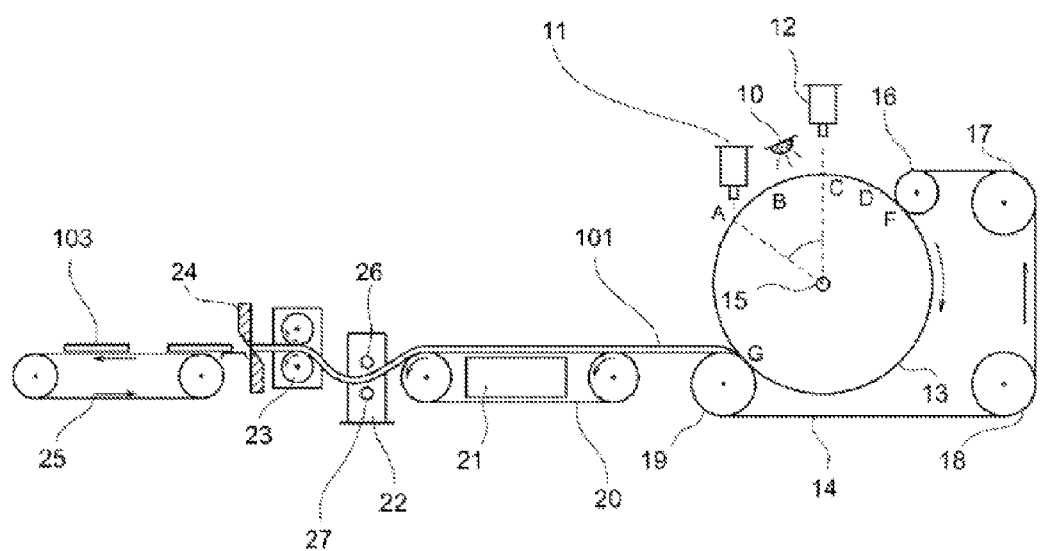

[Fig. 5]
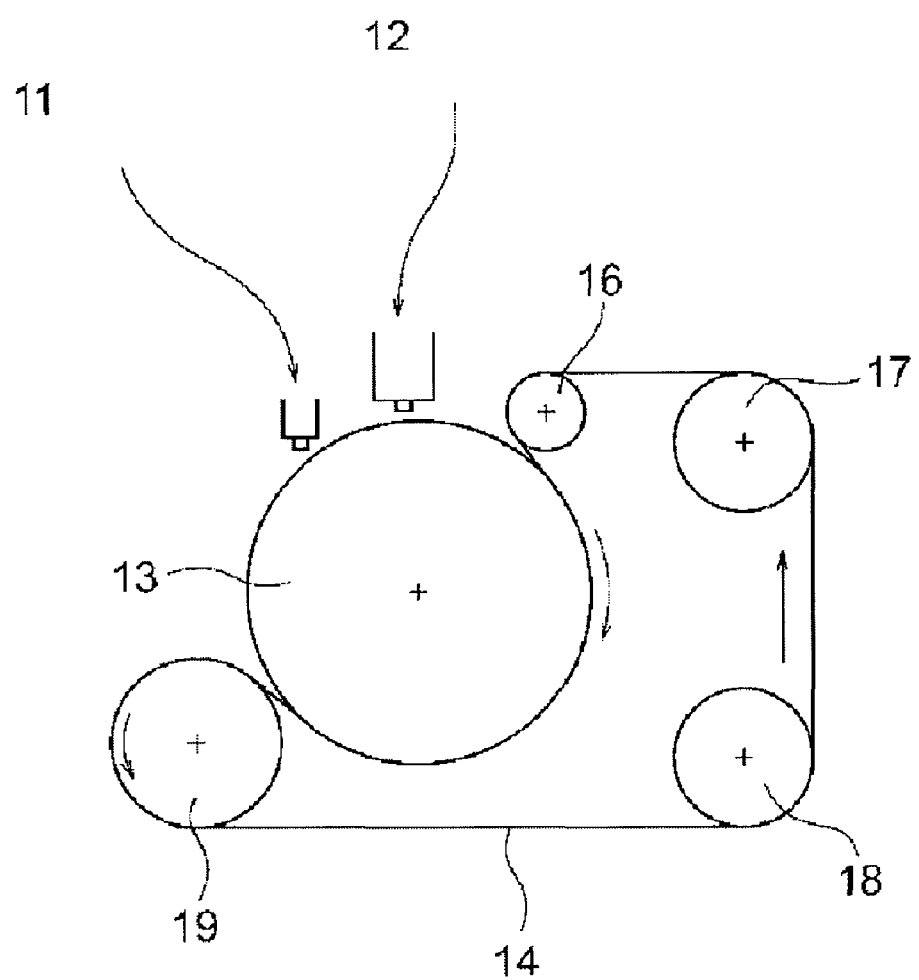

[Fig. 6]
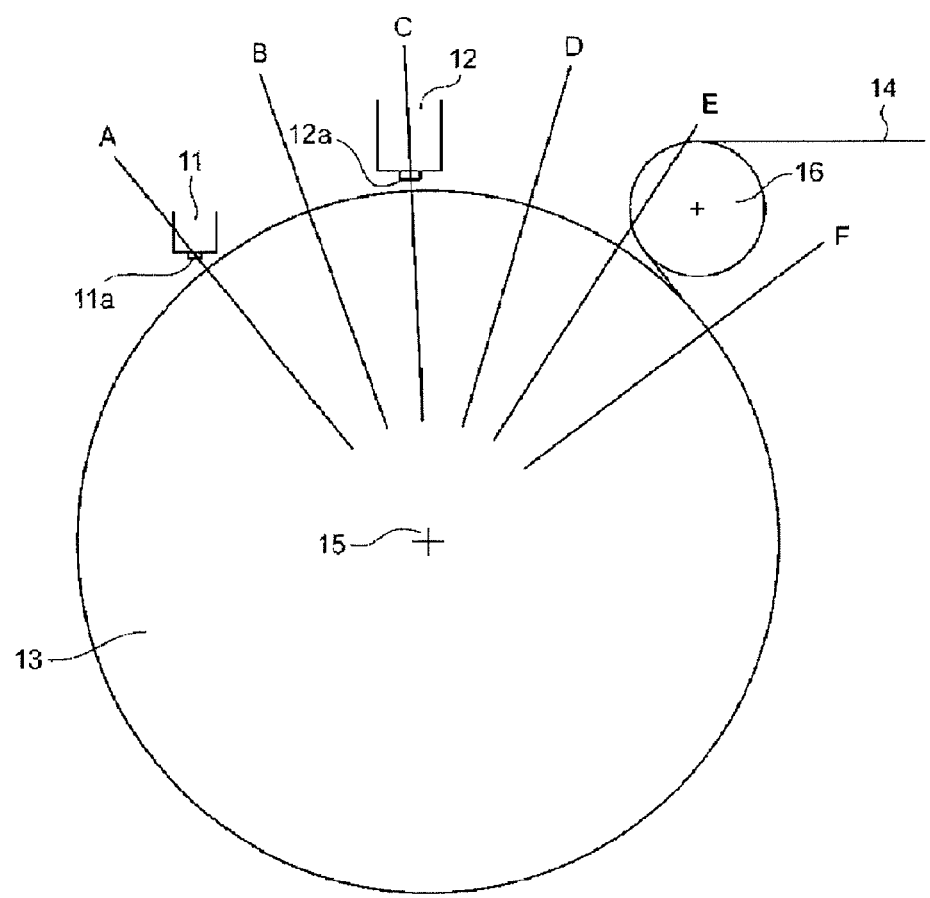

[Fig. 7]
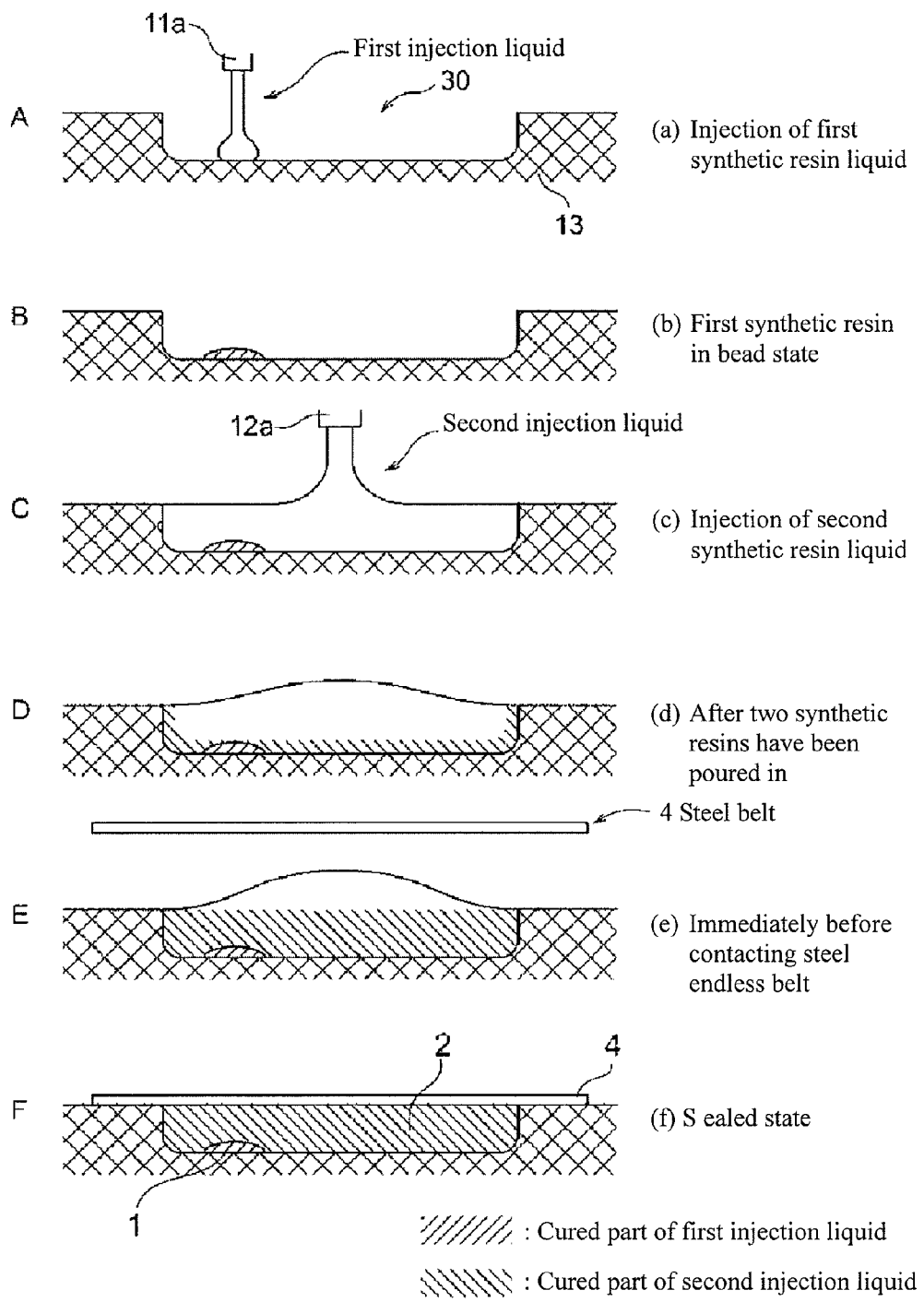

[Fig. 8]
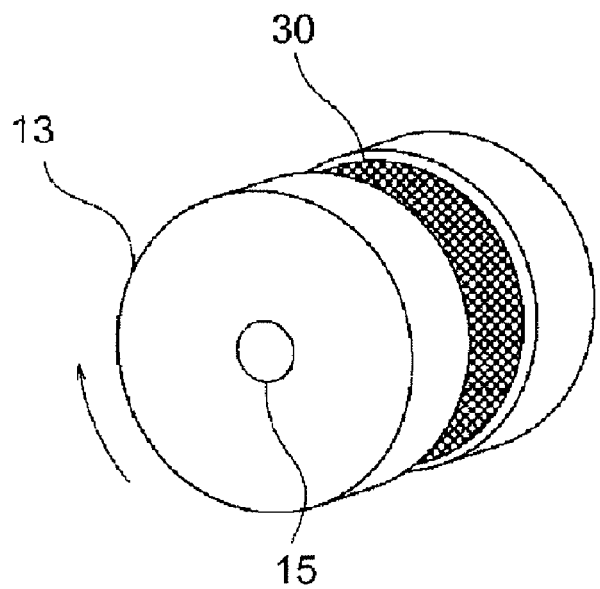
[Fig. 9]
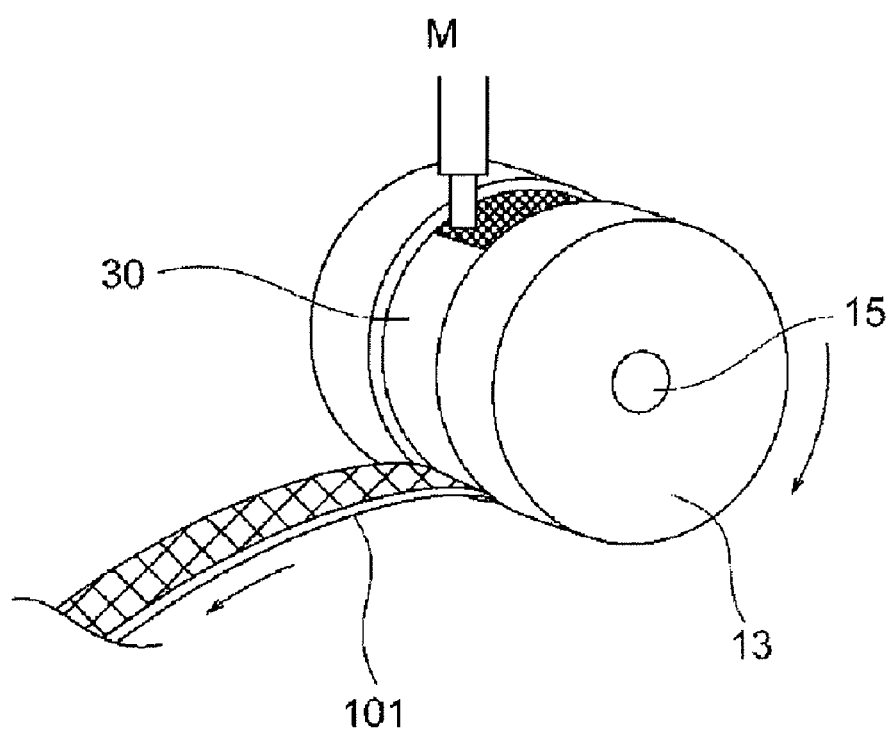

[Fig. 10]
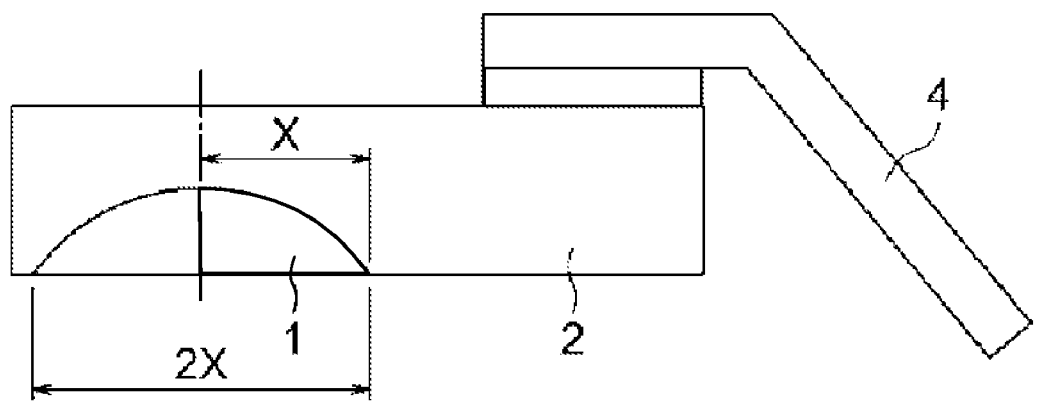

[Fig. 11]
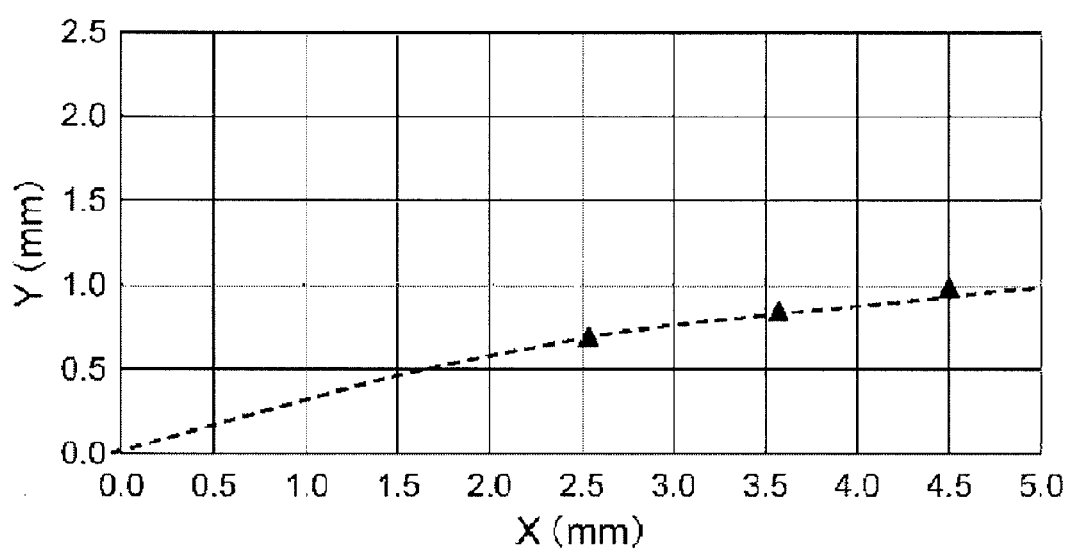

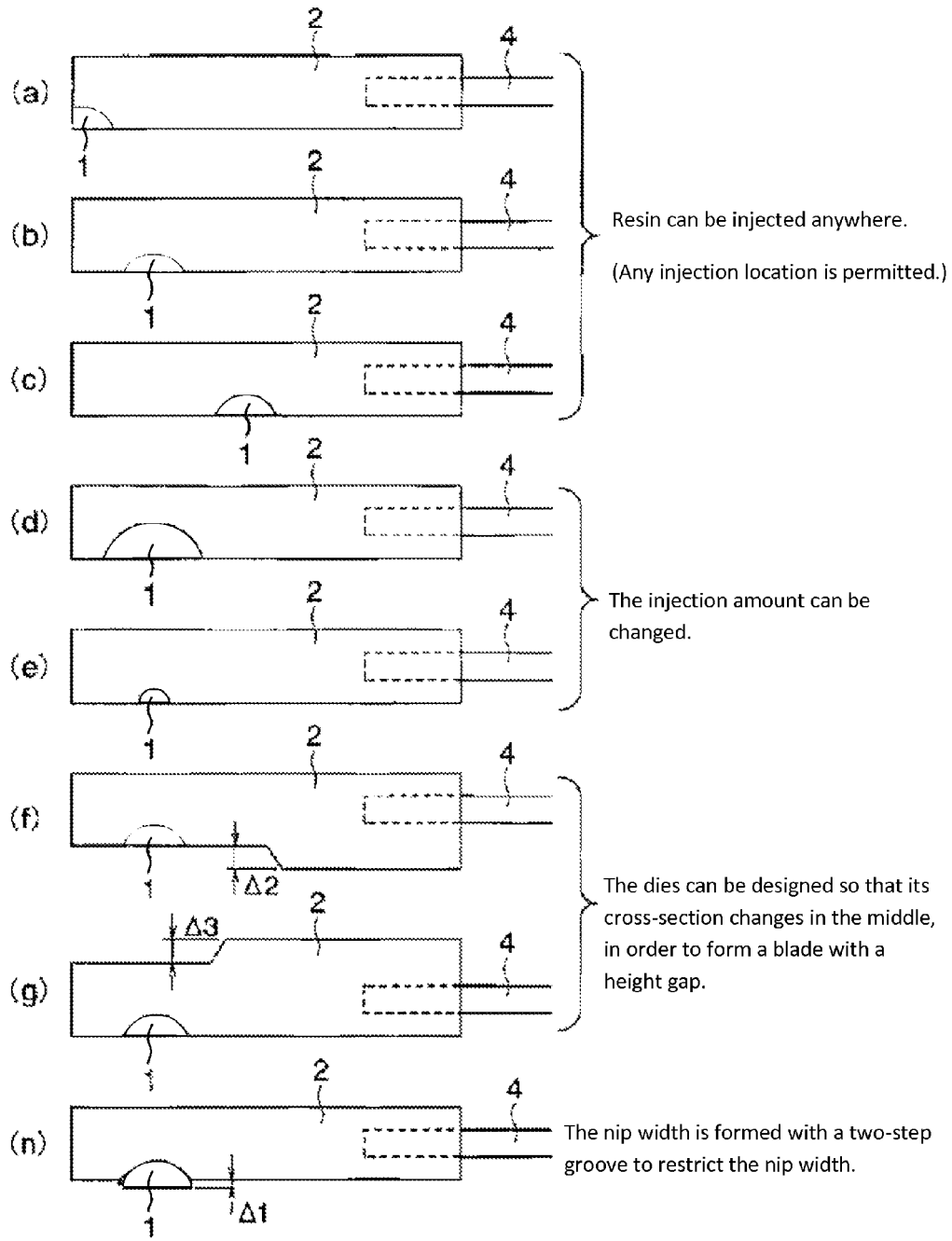
[Fig. 12]

[Fig. 13]
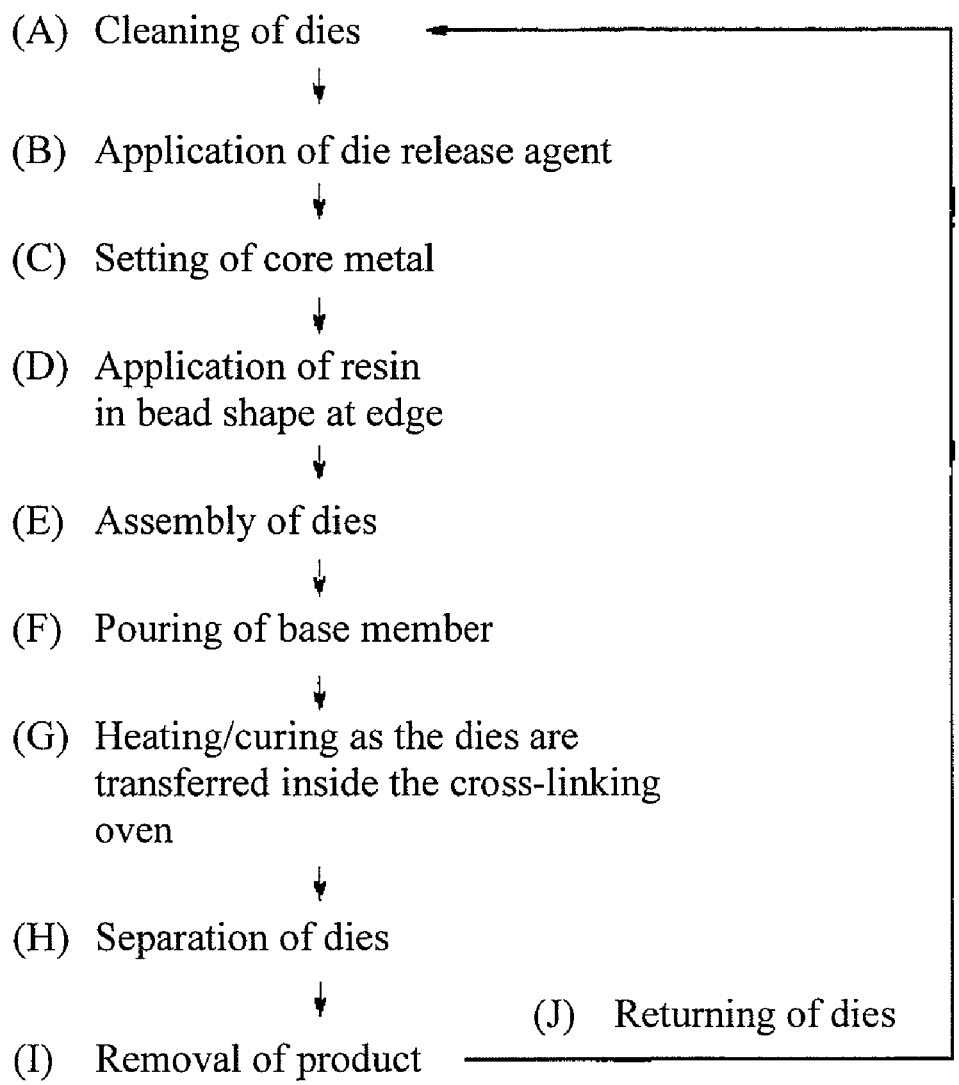

[Fig. 14]
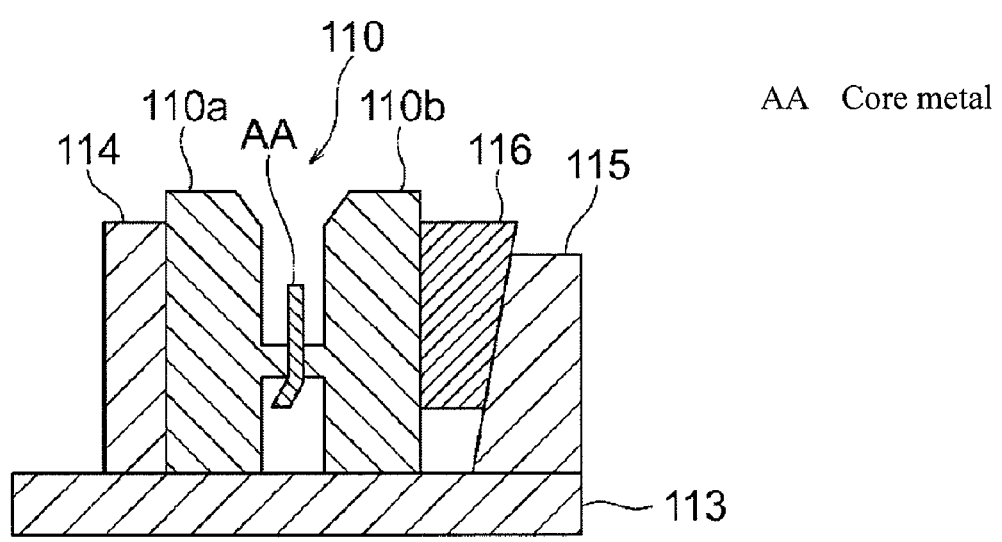
AA  Core metal

[Fig. 15]
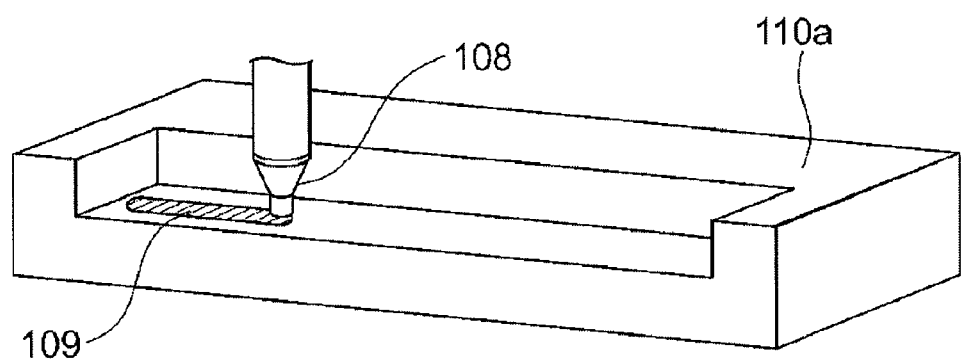

[Fig. 16]
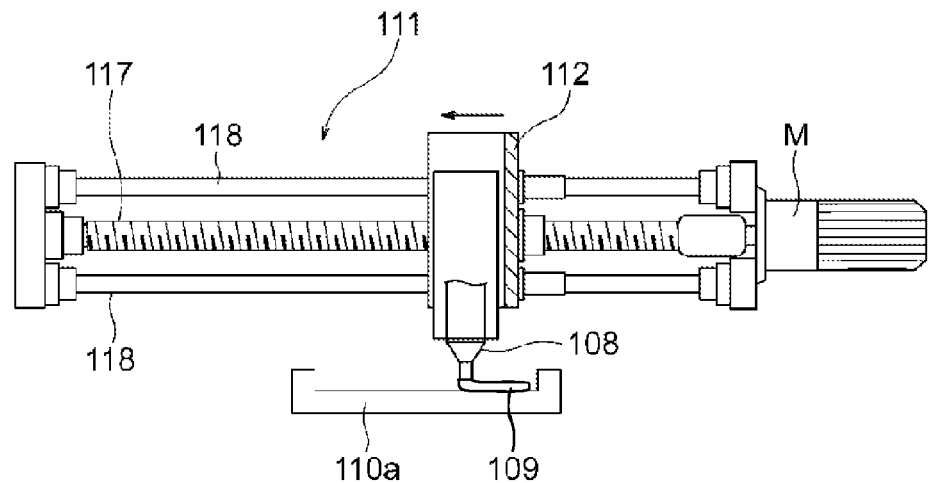
[Fig. 17]
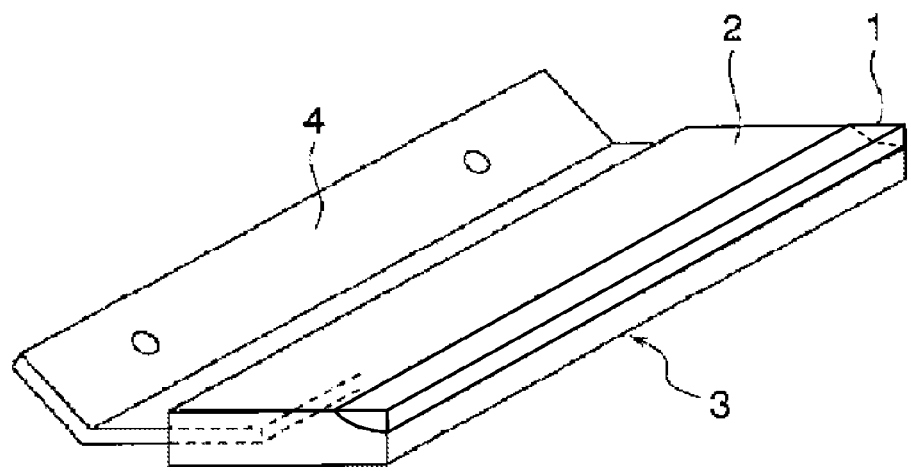

[Fig. 18]
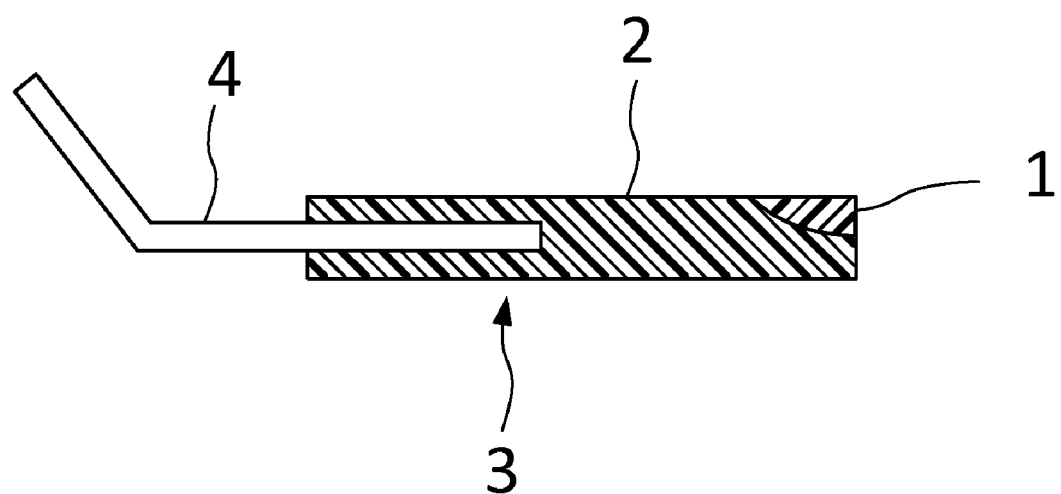

BLADE FOR ELECTROPHOTOGRAPHIC DEVICE WITH ELASTIC RUBBER MEMBER CONSTITUTED BY EDGE/NIP AND BASE PORTIONS OF DIFFERENT MATERIALS

This application is the U.S. National Phase under 35 U.S.C. §371 of International Application PCT/JP2008/050390, filed Jan. 29, 2008, which claims priority to Japanese Patent Application No. 2007-018162, filed Jan. 29, 2007. The International Application was published under PCT Article 21(2) in a language other than English.

TECHNICAL FIELD

The present invention relates to a blade for an electro-photographic device. Electro-photographic devices include copiers, printers, facsimiles and other devices adopting the electro-photographic method. In particular, the present invention relates to a material for producing a cleaning blade or development blade made of a thermo-setting polyurethane, as well as a method and apparatus for manufacturing the same.

PRIOR ART

Blades for electro-photographic devices are constantly rubbing with the mating material to scrape out toner or form a thin film, and thus they generally use polyurethanes offering excellent wear resistance.

Prior literatures are available that illustrate comprehensive examples of various types of polyurethanes (such as Patent Literature 1: Japanese Patent Laid-open No. 2000-235337 (Tokai Rubber)).

In reality, however, ester polyurethane is used for commercial blades. Ester polyurethane is generally used for its high wear resistance. On the other hand, however, ester polyurethane is easy to hydrolyze and thus presents the problem of pressure contact performance and physical properties deteriorating over time. Despite such problem, ester polyurethane is still used as the users attach importance to its wear resistance. Ether polyurethane, another representative type of polyurethane, offers resistance to hydrolysis but its wear resistance is lower than ester polyurethane. Accordingly, the reality is that ether polyurethane is deemed not practical and therefore not used at the present.

Also in recent years, toner grains are becoming increasingly finer and rounder to achieve higher image quality, and optimal points for blades in terms of cleaning and thin film formation continue to decrease. To reflect this trend for smaller and more spherical toner grains, cases are increasing whereby the cleaning blade is used in a condition where it makes strong pressure contact with the mating material in order to clean toner without fail, and this requires the blade to offer greater wear resistance and undergo less permanent deformation.

In other words, the blade is subject to increasingly diverse requirements such as greater wear resistance at blade edges and minimal permanent strain at other locations, and there are now limits to using only a single material to design polyurethanes that would constitute blades. This has led to proposals of methods to constitute the edge layer and back surface layer using separate blends, respectively, where materials that can be put to practical use in terms of arrangement, structure, etc., are being sought.

After continuous efforts of earnest research and development to find a blade material that permits the positions and shapes of its edge and nip to be formed by a material different from the base, the applicant for the present invention had earlier developed technologies for controlling the aforementioned positions and shapes and filed patent applications accordingly (Japanese Patent Application Nos. 2005-218238 (CP, two layers) and 2005-357859 (split dies, two layers)).

Examples of several prior literatures disclosing partially changed materials are given below.

Patent Literature 2 (Japanese Patent Laid-open No. 2002-214989) discloses a forming of two polyester urethane layers in the "What Is Claimed Is" section. Use of two layers both constituted by a polyester urethane only offers the same level of hydrolysis property as expected from normal materials comprising one urethane layer, and therefore no improvement is expected.

Other prior literatures relating to a two-layer blade include the following:
Surface Coating Method Methods to treat and modify the surface with a coating agent are proposed (such as the one disclosed in Patent Literature 3: Japanese Patent Laid-open No. 2001-356566). This specific literature talks about an example of coating a liquid material over the surface layer of a polyurethane sheet (first layer) that has been formed by the centrifugal forming method, and then heating and curing the liquid material to achieve a rubber member for blade having the second layer laminated on top of the first layer.

Methods are available to use the dipping method as a means of coating (such as the one disclosed in Patent Literature 4: Japanese Patent Laid-open No. 2004-46145).
Centrifugal Forming Method, Die Splitting Method, Attachment Method Methods are available to form two layers by means of centrifugal forming (such as the one disclosed in Patent Literature 5: Japanese Patent Laid-open No. 2004-184462; refer to [0076]). Also, there are methods to attach together separately prepared rubber members by means of bonding (such as the one disclosed in Patent Literature 6: Japanese Patent Laid-open No. Sho 60-165682).
Method of Impregnating Different Material to Modify Rubber Methods have been proposed to improve the performance of a cleaning blade by masking the parts of a polyurethane blade that need not be treated, impregnating polycyanoacrylate, isocyanate, water, silicon, etc., into the polyurethane blade, and then curing the blade by means of heating or other reaction, to modify the quality near the blade edge (such as increasing the hardness, changing the visco-elasticity characteristics, changing the friction coefficient, etc.) (such as the ones disclosed in Patent Literatures 4 and 7: Japanese Patent Laid-open Nos. 2004-46145 and 2004-233818).

The applicant for the present invention had also researched and developed embodiments of the surface coating method, centrifugal forming method, impregnation method, etc., disclosed in Patent Literatures 8, 9 and 10: Japanese Patent Laid-open Nos. Hei 9-127846, 2002-214990 and Hei 11-212414, for example, regarding multi-layer blades.

Patent Literature 1: Japanese Patent Laid-open No. 2000-235337
Patent Literature 2: Japanese Patent Laid-open No. 2002-214989
Patent Literature 3: Japanese Patent Laid-open No. 2001-356566
Patent Literature 4: Japanese Patent Laid-open No. 2004-46145
Patent Literature 5: Japanese Patent Laid-open No. 2004-184462
Patent Literature 6: Japanese Patent Laid-open No. Sho 60-165682

Patent Literature 7: Japanese Patent Laid-open No. 2004-233818

Patent Literature 8: Japanese Patent Laid-open No. Hei 9-127846

Patent Literature 9: Japanese Patent Laid-open No. 2002-214990

Patent Literature 10: Japanese Patent Laid-open No. Hei 11-212414

SUMMARY OF THE INVENTION

Problems to Be Solved by the Invention

The object of the present invention is to provide a blade for an electro-photographic device formed by two layers, which undergoes minimal permanent deformation and offers excellent mechanical strength, wear resistance and compliance to the use environment.

The applicant for the present invention had earlier developed technologies to accurately provide a different material partially at the edge and nip of a blade, and filed patent applications to propose blades for electro-photographic devices formed by partially different materials (Japanese Patent Application Nos. 2005-218238 (CP, two layers) and 2005-357859 (split dies, two layers)). Based on these inventions, the applicant for the present invention now provides a blade for an electro-photographic device where polyurethanes used for the edge/nip and base are specified. A method for manufacturing such blade is also provided.

Means for Solving the Problems

Basically, the present invention uses ester polyurethane for the edge and nip, while using ether polyurethane for the base.

The key means for solving the aforementioned problems, as presented by the present invention, are as follows:

(1) A blade for an electro-photographic device whose edge and base are constituted by different materials, wherein such blade for an electro-photographic device is characterized in that at least the edge is made of ester polyurethane and the base other than the edge is made of ether polyurethane.

(2) A blade for an electro-photographic device whose nip and base are constituted by different materials, wherein such blade for an electro-photographic device is characterized in that at least the nip is made of ester polyurethane and the base other than the nip is made of ether polyurethane.

(3) A blade for an electro-photographic device according to (1) or (2), characterized in that the ether polyurethane constituting the base is made of polytetramethylene glycol urethane or polyoxy propylene urethane.

(4) A blade for an electro-photographic device according to (1), characterized in that the hardness of the base is 60 to 85 in JIS-A hardness.

(5) A blade for an electro-photographic device according to any one of (1) to (4), characterized in that the ether polyurethane constituting the base has a rate of change in impact resilience of 10% or less at temperatures of 0 to 50° C.

(6) A blade for an electro-photographic device according to any one of (1) to (5), characterized in that the ether polyurethane constituting the base has a peak tan δ temperature of −33 to 0° C. as measured under the following conditions:
Tan δ measurement conditions (temperature variance)
Dynamic strain: 0.1%/Frequency: 10 Hz/Rate of rise in temperature: 2° C./min.

(7) A blade for an electro-photographic device according to any one of (1) to (6), characterized in that the edge thickness is 0.1 to 1.0 mm.

(8) A blade for an electro-photographic device according to any one of (1) to (7), characterized in that the edge shape has a circular-arc cross-section.

(9) A blade for an electro-photographic device according to any one of (1) to (8), characterized in that such blade for an electro-photographic device is a cleaning blade used to clean residual toner.

(10) A blade for an electro-photographic device according to any one of (1) to (8), characterized in that such blade for an electro-photographic device is a development blade.

(11) A method of manufacturing a blade for an electro-photographic device, characterized in that the material for forming one of an edge layer made of ester polyurethane or a base layer made of ether polyurethane is poured into a cylindrical die and while the die is being rotated, the material is cured halfway, after which the material for forming the other layer is poured into the die and while the die is being rotated, both materials are cured, thereby forming a blade material constituted by two layers.

(12) A method of forming a blade for an electro-photographic device, wherein a forming drum having a forming groove on the outer periphery and a heating device on the inside is provided, with such forming drum equipped, around its outer periphery, with a means for supplying synthetic resin into the forming groove as well as an endless belt that turns synchronously with the rotation of the forming drum in a manner covering the forming groove of the forming drum, and where a forming space formed by the endless belt and forming groove is used to form a band-shaped blade material having a specified width and thickness, from the synthetic resin material supplied to the forming groove, according to the rotation of the forming drum, and wherein such method is characterized in that ester polyurethane material for forming the edge is poured in first and cured halfway, after which ether polyurethane material for forming the base is poured in and cured, thereby forming a blade material.

Effects of the Invention

1. According to the present invention, wear resistance and stability can be achieved simultaneously by using ester polyurethane for the edge and nip where wear resistance is required, and by using ether polyurethane for the base where contact pressure property and other stable physical properties are required, and consequently a blade for an electro-photographic device that can also support small-diameter toners, etc., and provide clean images in a stable manner can be achieved.

2. It is difficult to achieve, with a single material, a blade that undergoes minimal permanent deformation, offers excellent mechanical strength and wear resistance, has low temperature dependence of visco-elasticity in the range of use environment, and whose hardness (pressure contact force of the blade) is in an appropriate range (=blade that can perform cleaning even in a low-temperature environment and does not produce abnormal noises in a high-temperature environment). However, a blade conforming to the present invention solved the aforementioned problem by using ester polyurethane for the edge or nip and ether polyurethane for the base.

3. Traditionally blade members have generally used elastic bodies made of polyester polyurethane, because polyester polyurethane has excellent mechanical strength, wear resistance, etc., and does not damage the mating member that contacts polyester polyurethane. The present invention uses ester polyurethane offering excellent wear resistance and mechanical strength for the edge used for cleaning and formation of thin film, and ether polyurethane having low temperature dependence in the range of use environment and undergoing small permanent strain, especially polytetramethylene glycol polyurethane, for other areas. In particular, the present invention can provide a blade of stable quality by adopting a manufacturing method that conforms to the continuous forming method using a rotary drum with a forming groove provided on its outer periphery.

4. The present invention can provide a blade that realizes low-temperature cleaning, reduces abnormal noises at high temperature and stabilizes the pressure contact force over a long period of time.

5. The present invention allows for blade production at low cost by using ether polyurethane.

BRIEF DESCRIPTION OF THE DRAWINGS

FIG. 1 Example of a two-layer blade conforming to the invention under the present application for patent
FIG. 2 Perspective view showing an example of a blade whose edge layer is formed as a partial layer
FIG. 3 Section view showing an example of a blade whose edge layer is formed as a partial layer
FIG. 4 Example of a continuous forming apparatus
FIG. 5 Forming device part of a continuous forming apparatus
FIG. 6 Schematic view of a forming drum
FIG. 7 Drawing explaining a curing process
FIG. 8 Schematic perspective view of a forming drum
FIG. 9 Schematic view of how a band-shaped blade material is formed
FIG. 10 Example of an elastic rubber member with a partial layer
FIG. 11 Graph showing the size of a partial layer
FIG. 12 Drawing showing variations of a partial layer
FIG. 13 Process chart of the split-die forming method
FIG. 14 Schematic view of a split-die structure
FIG. 15 Drawing showing a condition where a resin bead is discharged to one side a split die
FIG. 16 Resin bead feeder of moving discharge head type
FIG. 17 Perspective view of a cleaning blade conforming to the split-die forming method
FIG. 18 Section view of a cleaning blade conforming to the split-die forming method

DESCRIPTION OF THE SYMBOLS

1 Partial layer (edge, nip)
2 Base layer
3 Elastic rubber member
4 Support member
10 External heating device
11 First casting-machine mixing belt
12 Second casting-machine mixing belt
13 Forming drum
14 Endless belt
15 Rotary axis
16 Pre-heating roll
17 Guide roll
18 Tension roll
19 Cooling roll
20 Cooling conveyor
21 Cooling device
22 Slack detector
23 Feed roll
24 Cutting device
25 Conveyor
26 Top sensor
27 Bottom sensor
30 Forming groove
101 Band-shaped blade material
103 Blade member cut to fixed dimension
108 Discharge head
110 Die
110a, 110b Split dies
111 Device for casting into split dies
112 Slide plate
113 Base plate
114 Side wall
115 Inclined side wall
116 Die-clamping member
117 Ball screw
118 Guide bar

BEST MODE FOR CARRYING OUT THE INVENTION

The invention under the present application for patent is a blade for an electro-photographic device that uses ester polyurethane for the edge or nip and ether polyurethane for the base.

1. Example of Multi-Layer Blade

A cleaning blade or development blade conforming to the present invention can have a two-layer structure constituting the entire blade, as shown in FIG. 1, or a partial two-layer structure, as shown in FIG. 2 or 3. It is also possible for the blade to have a three-layer structure or multiple partial layers.

With both conventional blades and blades conforming to the present invention, the contact pressure force becomes insufficient and thus cleaning becomes impossible if the blade hardness deviates from the specified range. If the contact pressure force is excessive, on the other hand, wear or chipping occurs and cleaning problems result. Also when the temperature dependence of impact resilience exceeds 10%, abnormal noises occur in a high-temperature environment, or toner passes through in a low-temperature environment, and consequently the required performance cannot be met in both high-temperature and low-temperature environments. In addition, toner passes through in a low-temperature environment if the tan δ peak temperature exceeds the upper limit, while abnormal noises occur if the tan δ peak temperature breaches the lower limit. Furthermore, a permanent elongation rate of over 5% causes the contact pressure force to drop over a long period of storage due to permanent deformation, and eventually pass-through of toner occurs. These various factors negatively affect the blade function.

The present invention reduces these adverse effects basically by using ester polyurethane for the edge or nip, and ether polyurethane for the base, and thereby controlling the various physical properties.

To be specific, the present invention provides a blade having the effects described below. Ester polyurethane is used for the edge and nip where wear resistance is required, while ether polyurethane is used for the base where pressure contact performance and other stable physical properties are required, to achieve both wear resistance and stability, and this way a blade for an electro-photographic device that can also support small-diameter toners, etc., and provide clean images in a stable manner can be achieved. It is difficult to achieve, with a single material, a blade that undergoes minimal permanent deformation, offers excellent mechanical strength and wear resistance, has low temperature dependence of visco-elasticity in the range of use environment, and whose hardness (pressure contact force of the blade) is in an appropriate range (=blade that can perform cleaning even in a low-temperature environment and does not produce abnormal noises in a high-temperature environment). Traditionally blade members have generally used elastic bodies made of polyester polyurethane, because polyester polyurethane has excellent mechanical strength, wear resistance, etc., and does not damage the mating member that contacts polyester polyurethane. The present invention uses ester polyurethane offering excellent wear resistance and mechanical strength for the edge used for cleaning and formation of thin film, and ether polyurethane having low temperature dependence in the range of use environment and undergoing small permanent strain, especially polytetramethylene glycol polyurethane, for other areas. The present invention can provide a blade of stable quality by adopting a manufacturing method that conforms to the continuous forming method using a rotary drum with a forming groove provided on its outer periphery. The present invention can provide a blade that realizes low-temperature cleaning, reduces abnormal noises at high temperature and stabilizes the pressure contact force over a long period of time. The present invention allows for blade production at low cost by using polyether.

2. Polyurethane Material

A polyurethane composition containing polyisocyanate and polyol is used as the material for forming urethane.

For the polyol component, ester polyurethane is used for the layer that includes the edge and nip, while ether polyurethane is used for the base other than the layer that includes the edge and nip.

Polyurethane materials used by the present invention are preferably thermo-setting polyurethane of non-solvent type.

2-1. Ester Polyol

Ester polyurethane, which has long been in use, can be employed for the ester polyurethane used under the present invention to form the edge layer.

Polyester diol, polyester triol and other polyester polyols.

Polyester polyols are produced from a polybasic organic acid and a polyol. Polycaprolactone diol and other polycaprolactone polyols obtained by means of ring-opening polymerization of ε-caprolactam, can also be used.

The polybasic organic acid is not specifically limited, and examples include dicarboxylic acids such as oxalic acid, succinic acid, glutaric acid, adipic acid, pimelic acid, suberic acid, azelaic acid, sebacic acid, isosebacic acid and other saturated fatty acids, maleic acid, fumaric acid and other unsaturated fatty acids, and phthalic acid, isophthalic acid, terephthalic acid and other aromatic acids. In addition, maleic anhydride, phthalic anhydride and other acid anhydrides, and dimethyl terephthalate and other dialkyl esters can also be used. Furthermore, dimer acids obtained through dimerization of unsaturated fatty acids can be used, as well. These can be used alone or two or more of them can be combined.

The polyol is not specifically limited, and examples include ethylene glycol, diethylene glycol, triethylene glycol, propylene glycol, dipropylene glycol, butylene glycol, neopentyl glycol, 1,6-hexylene glycol and other diols, trimethylol ethane, trimethylol propane, hexane triol, glycerin and other triols, sorbitol and other hexaols, polybutylene adipate (PBA), and polyethylene adipate, among others. These can be used alone or two or more of them can be combined.

2-2. Ether Polyol

Polyoxy tetramethylene glycol, polyoxy propylene glycol and other polyether polyols.

Examples of the polyether polyol include ethylene oxide, propylene oxide, trimethylene oxide, butylene oxide, α-methyl trimethylene oxide, 3,3'-dimethyl trimethylene oxide, tetrahydrofuran, dioxane, dioxamine and other cyclical ethers.

2-3. Polyisocyanate

The polyisocyanate is not specifically limited, and examples include 4,4'-diphenyl methane diisocyanate (MDI), 2,4-tolylene diisocyanate (2,4-TDI), 2,6-tolylene diisocyanate (2,6-TDI), 3,3'-bitolylene-4,4'-diisocyanate, 3,3'-dimethyl diphenyl methane-4,4'-diisocyanate, 2,4-tolylene diisocyanate uretidine dione (dimer of 2,4-TDI), 1,5-naphthylene diisocyanate, methaphenylene diisocyanate, hexamethylene diisocyanate, isophoron diisocyanate, 4,4'-dicyclohexyl methane diisocyanate (hydrogenated MDI), carbodiimide denatured MDI, orthotoluidine diisocyanate, xylene diisocyanate, paraphenylene diisocyanate, lysine diisocyanate methyl ester and other diisocyanates, triphenyl methane-4,4', 4"-triisocyanate and other triisocyanates, and polymeric MDI, among others. These can be used alone or two or more of them can be combined. Of these, MDI is preferable from the viewpoint of wear resistance.

2-4. Other Materials

In addition to the aforementioned polyisocyanates and polyols, any chain extension agent, surface active agent, flame retardant, coloring agent, filler, plasticizer, stabilizer, mold release agent, catalyst or other normally used agent can be added to the polyurethane composition.

The chain extension agent is not specifically limited and any known chain extension agent can be used, such as 1,4-butane diol (1,4-BD), ethylene glycol, diethylene glycol, propylene glycol, dipropylene glycol, hexane diol, 1,4-cyclohexane diol, 1,4-cyclohexane dimethanol, xylene glycol, triethylene glycol, trimethylol propane (TMP), glycerin, pentaerythritol, sorbitol, 1,2,6-hexane triol and other polyols with a molecular weight of 300 or less. These can be used alone or two or more of them can be combined.

Examples of the catalyst include amine compounds such as tertiary amines, and organic metal compounds such as organic tin compounds, among others. Of these, amine compounds are preferable.

Examples of the tertiary amines include triethyl amine and other trialkyl amines, N,N,N',N'-tetramethyl-1,3-butane diamine and other tetraalkyl diamines, dimethyl ethanol amine and other aminoalcohols, ethoxylated amine, ethoxylated diamine, bis (diethyl ethanol amine) adipate and other ester amines, triethylene diamine, N,N-dimethyl cyclohexyl amine and other cyclohexyl amine derivatives, N-methyl morpholine, N-(2-hydroxy propyl)-dimethyl morpholine and other morpholine derivatives, and N,N'-diethyl-2-methyl piperazine, N,N'-bis-(2-hydroxy propyl)-2-methyl piperazine and other piperazine derivatives, among others.

Examples of the organic tin compounds include dibutyl tin dilaurate, dibutyl tin di (2-ethyl hexoate) and other dialkyl tin compounds. Other examples include tin(II) 2-ethyl caproate and tin(II) oleate, among others.

2-5. Examples of Resin

Synthetic resins that can be used under the present invention are mainly thermo-setting polyurethane resins. In particular, two-liquid thermo-setting polyurethanes of non-solvent type are suitable. Under the continuous forming method using a rotary drum having a forming groove on its outer periphery, the time from casting to removal is within one rotation of a forming drum, and the degree of solidification by polymerization needs to reach, within approx. 30 to 60 seconds, a sufficient level at which the formed product can be removed. Isocyanate, polyol, cross-linking agent and catalyst meeting these conditions are selected as part of the material design. In the processes after removal, secondary cross-linking and maturation can be implemented. Even when split dies are used, it is desirable to shorten the initial curing time of ester polyurethane that constitutes the edge and nip.

Additive components include lubricant, conductivity adding agent, and abrasive grains, among others.

Examples of the lubricant include polytetrafluoroethylene, boron nitride, graphite, molybdenum disulfide, polydimethyl siloxane and other silicon compounds.

The conductivity adding substance is not specifically limited, and ketjen black, acetylene black, furnace black and other carbon blacks, graphite, metal fillers, metal oxide whiskers and other electron conductive substances, metal soap, perchloric acid salt and other ion conductive substances can be used alone or two or more of these can be combined. These are applied to development blades and charged blades.

The abrasive grains are applied to a blade used to refresh the surface of the mating material that contacts the blade such as a photo conductor.

For example, the following polyurethane described in the examples of polyurethane resins proposed earlier by the applicant for the present application for patent in Japanese Patent Nos. 3004586, 2942183, and 2645980, and Japanese Patent Laid-open Nos. 2002-214989 and 2002-214990, etc., can be used.

A bifunctional polyol whose high-molecular-weight polyol component whose number average molecular weight is 1000 to 3000 that is mixed with at least one of a urethane pre-polymer liquid and cross-linking agent liquid, and a trifunctional polyol whose number average molecular weight according to the above is 92 to 980, are combined into a polyol with an average function group number of 2.02 to 2.20, by adding an appropriate amount of diisocyanate compound that would achieve an isocyanate group content of 5 to 20%, in order to prepare a pre-polymer, and then this pre-polymer is mixed at 40 to 70° C. with a cross-linking agent of an appropriate amount that would achieve an equivalent OH/NCO group ratio of 0.85 to 1.00, to prepare a polyurethane liquid (uncured polyurethane composition).

Additionally, it is desired that the number average molecular weight of the aforementioned high-molecular-weight polyol component is preferably in a range of 1000 to 3000. By casting this composition, reaction occurs smoothly and the obtained blade offers favorable physical properties. In other words, the number average molecular weight of the polyol used is in a range of 1000 to 3000, and if it is less than 1000, the resulting urethane rubber becomes too hard and the required physical property (flexibility) cannot be achieved. If it exceeds 3000, on the other hand, high viscosity during forming makes casting difficult.

Also when the average functional group number (f) is 1, the substance becomes a monool and thus polymerization does not occur. If f is equal to or greater than 5, on the other hand, excessive polyfunctionalization increases the viscosity of the polymer and causes its physical properties to drop.

The following can be used as the component for manufacturing a polyurethane elastomer conforming to the present invention. Examples of the polyether polyol include polyethylene glycol, polypropylene glycol, polyoxy tetramethylene glycol and other polyoxy alkylene glycols, as well as ethylene oxide, propylene oxide and other alkylene oxide adducts of bisphenol A and glycerin. Examples of the polyester polyol include any polyester polyol obtained through polymerization reaction of adipic acid, phthalic anhydride, isophthalic acid, maleic acid, fumaric acid or other dibasic acid, with ethylene glycol, propylene glycol, 1,4-butane diol, 1,6-hexane diol, trimethylol propane or other glycol, as well as polycaprolactone diol.

Examples of the diisocyanate compound include tolylene diisocyanate, 4,4-diphenyl methane diisocyanate, hexamethylene diisocyanate, isophorone diisocyanate, and 1,4-cyclohexane diisocyanate, among others. Examples of the chain extension agent include ethylene glycol, 1,4-butane diol, diethylene glycol, 1,6-hexane diol, neopentyl glycol and other low-molecular-weight diols as well as ethylene diamine, hexamethylene diamine, isophorone diamine and other diamines. Desirably, low-molecular-weight diols are used. Furthermore, trimethylol propane, triethanol amine, glycerin or ethylene oxide or propylene oxide adduct of any of the foregoing may be added, if necessary, as a polyfunctional component.

When manufacturing the aforementioned polyurethane, the equivalent OH/NCO group ratio is in a range of 0.8 to 1.05 from the viewpoint of physical properties of the polyurethane to be produced, or desirably in a range of 0.85 to 1.00. In addition, any reaction promoter constituted by a general amine compound, organic tin compound, etc., can also be used, if necessary. For example, the reaction promoter disclosed in Paragraph 0022 of Japanese Patent No. 2942183 is an imidazole derivative or other substance expressed by the general formula specified below, where specific examples of such reaction promoter include 2-methyl imidazole, 1,2-dimethyl imidazole and other similar substances offering high reaction temperature dependence based on their chemical structure.

[Chemical Formula 1]

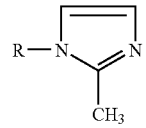

In the formula, R represents hydrogen, methyl group or ethyl group.

Such reaction promoter is used by an effective amount in a range of 0.01 to 0.5 part by weight, or preferably in a range of 0.05 to 0.3 part by weight, relative to 100 parts by weight of the pre-polymer. Ideally, a substance meeting the above requirement and also offering thermo-sensitivity or slow-acting property can be used favorably, because such substance provides a longer working time of the resin used and achieves a shorter die release time. Specific examples of such substance include so-called block amine such as 1,8-diazabicyclo(5,4,0) undecene-7-organic acid salt and 1,5-diazabicyclo(4,3,0) nonene-5-organic acid salt, and a mixture thereof, among others. Under the present invention, a commercial two-liquid mixing and casting machine can be used to mix and agitate the urethane pre-polymer liquid, which is the material component for thermo-setting polyurethane, with the cross-linking agent liquid. As for the metering pump, it is desirable to use a type with three or more consecutive plungers in consideration of metering accuracy. However, a gear pump type can also be used. In particular, the manufacturing apparatus proposed under the present invention needs to use a reaction promoter to achieve quick curing in order to obtain a specified hardness at the time of die release, and therefore the agitation and mixing chamber is ideally a small-capacity chamber, such as the one disclosed in the Japanese translation of PCT Patent Application No. Hei 6-11389, which can prevent dwelling inside the mixing chamber and also suppress heat generation as a result of reaction.

The foregoing illustrated two-liquid thermo-setting polyurethane resins in details. However, the blade resin that can be used under the present invention is not limited to these resins, and both thermo-plastic resins and thermo-setting resins can be used. Since a forming drum that rotates in a heated state is used, the heating and curing reaction starts immediately after casting, and accordingly non-solvent resins free from solvent are preferable.

These synthetic resin components are blended to create a resin composition that becomes the partial layer, and a resin composition that becomes the base layer, and the obtained resin compositions are used. In general, the synthetic resin that becomes the partial layer to be used for the edge, nip, etc., is designed to have high hardness and high impact resilience, while the resin used for the base layer is designed to have lower hardness and impact resilience than the edge layer.

3. Manufacturing Method

To form a two-layer structure comprising an ester polyurethane layer constituting the edge or nip and an ether polyurethane layer constituting the base, one of the following methods can be used: (1) Continuous forming method using a rotary forming drum having a groove formed on its outer periphery; (2) individual forming method using split dies; and (3) centrifugal forming method whereby liquid polyurethane material is poured onto the inner wall surface of the drum and then the drum is rotated to create a wide polyurethane sheet having multiple thin layers.

3-1. Continuous Forming Method Using a Rotary Forming Drum Having a Groove Formed on its Outer Periphery For this forming means, the means proposed earlier by the inventor of the invention under the present application for patent and disclosed in Japanese Patent Application No. 2005-218238 can be utilized. A synthetic resin tape whose width is the same as or slightly larger than the width of the elastic rubber tape made of synthetic resin and used by the blade, is produced continuously and then the obtained long tape is cut to a specified dimension, after which the sized tape is attached to one side edge of a metal support to produce a finished developing blade, cleaning blade, etc., This technology is defined as the basic manufacturing method.

The basic manufacturing means used by this manufacturing method is explained below. To be specific, a forming drum having a forming groove provided on its outer periphery is rotated around its horizontal axis, while at the same time polyurethane or other liquid material is poured continuously into the forming groove from near the apex, to achieve polymerization during the rotation of the forming drum, after which the continuously formed product of polyurethane, etc., which now exists in a tape form at a position forward of the pouring location, is separated and removed from the forming groove and then supplied to the subsequent processes. Since a tape-shaped formed product is produced continuously, a series of operations such as cutting tape to a specified dimension and attaching each sized tape to a metal support can be performed continuously in the subsequent processes, and this eliminates wastefulness in line operation and enhances productivity.

The specific manufacturing method is explained below.

This continuous forming method is implemented using multiple casting machines. By continuously supplying to the forming groove of the forming drum synthetic resins of different compositions from the respective casting machines, a synthetic resin blade material having two or more synthetic resin layers is produced. If the pouring ports are provided at front and rear positions with respect to the forming groove of the continuously rotating forming drum, the synthetic resin poured later covers the synthetic resin poured earlier and both resins are cured in this condition to form layers. The position, width and thickness of the resin layers can be controlled according to the position of the synthetic resin to be poured first, amount supplied, composition and type of synthetic resin, and rotating speed of the forming drum, among others. The synthetic resin to be pored later is supplied by an amount enough to fill the entire area, and forms the base layer.

If the prior synthetic resin is poured into the corners of the forming groove, a blade material having a different material in its edge can be produced. If the resin is poured into the middle area, a different material can be provided in the middle of the blade material. If the resin is poured into the bottom of the groove in a manner covering the entire bottom surface with a thin coat, a two-layer or multi-layer blade material can be produced over the entire surface.

By changing the cross-section depth of the forming groove, a blade material whose thickness changes partially can be produced. If the prior synthetic resin is supplied to a deep area, a different material layer can be formed in this area.

If the bottom of the forming groove is made rough, a blade material whose surface reflects such roughness can be produced.

The blade material having a different material layer at its edge is suitable for cleaning blades whose edge is contacted, while a blade material having a different material layer in the middle is suitable as a material for development blades or charged blades where the middle area is used as a nip to rub toner and thereby charge electricity.

Also, the physical properties of elastic rubber can be controlled by combining different materials, and this improves temperature adaptability in a high-temperature range, low-temperature range, etc., wear resistance, and so on.

Also under this continuous forming method of synthetic resin tape using a forming drum, the various manufacturing methods and components already proposed by the applicant for the present invention can be used.

The synthetic resin poured into the forming groove receives heat from the forming drum in the range where the groove is covered by the metal endless belt that rotates in a manner covering a part of the forming groove on the outer periphery of the forming drum, and curing and polymerization progresses as a result. At the position where the endless belt separates from the forming drum, the resin has already been formed into a tape having a groove-shaped cross-section. This tape is pulled out from the forming groove to obtain a continuous synthetic resin tape, just like under the prior proposals.

This method requires certain forming conditions such as removing the tape from the forming groove relatively quickly (such as within approx. 30 to 60 seconds) after pouring of resin, not applying pressure for the purpose of forming, making the lower half of the rotating forming drum the center of polymerization and curing, and minimizing the angle of separation from the forming groove. Accordingly, separation from the bottom of the forming groove is relatively easy and use of die release agent is not always required. In some cases, use of die release agent can have negative effects if finer or colored toner grains are used. If no die release agent is used according to an embodiment of the present invention, however, such problems do not occur.

In addition, elimination of the need to use die release agent permits use of other surface treatment agents, and this allows for active use of these other surface treatment agents for the purpose of surface improvement.

Also, an external heating means may be provided to heat the groove of the forming drum between the synthetic resin supply position and the area covered by the endless belt, in order to control polymerization. In addition, a cooling means that blows cool air from outside may be provided near the tape removal part to facilitate separation.

The size of the resin tape obtained according to the present invention supports both the width and thickness ranges of traditional development blades and cleaning blades. For example, tapes with a thickness of approx. 0.40 to 3.00 mm can be produced with sufficient ease.

A schematic diagram showing an example of how an arc-shaped partial layer is formed is given.

Take note that this example is based on measured experimental values and the present invention is not at all limited to this example. FIG. 10 shows an elastic rubber member having a base layer 2 and an arc-shaped partial layer 1. For the purpose of illustration, the following explanation assumes that the arc is a circular arc. The circular-arc-shaped partial layer 1 is a virtual partial arc having the radius R, where the width of the layer is assumed to be twice the arc X, while its height is assumed to correspond to the height Y of the circular arc.

In this example, the measured values of width X were 2.564 to 4.524 mm, while the measured values of height Y were 0.69 to 0.97 mm. A graph illustrating the relationship of this width X and height Y is shown in FIG. 11. A height of approx. 1 mm can be amply achieved at a width of 5 mm.

FIG. 12 shows examples of variations of the partial layer that can be produced based on this method. (a) represents the basic shape. In (b), the left end of the example in (a) is cut to make the partial layer 1 an edge. (c) is an example where the height Y is increased by increasing the surface tension or quickening the polymerization speed. (d) is an example where, as in (b) of (c), the left end is cut. (e) is an example where a partial layer of the same height as the thickness of the elastic rubber layer is formed, and then the left end is cut to form an edge. Additionally, (e) can also be achieved by grinding the top face of (b) or (d). (f) is an example where a greater height is achieved by a smaller width by ingenious blending of synthetic resin and trimming of the left end or top face. Take note that, as one method to increase the height Y relative to the width X, the area corresponding to the width X can be made slightly deeper at the bottom of the forming groove in order to prevent widening of the partial layer.

3-1-2. Continuous Forming Apparatus

The continuous forming apparatus comprises: a forming drum on which a forming groove with a concaved cross-section is formed over the entire outer periphery, wherein the drum is supported horizontally and rotated around its center axis; a mixing and casting machine positioned near the apex of the forming drum in such a way that the pouring port of the synthetic resin casting machine faces the forming groove (roughly between the 9 o'clock and 2 o'clock positions), if the rotating direction is clockwise, wherein the machine is used to mix and agitate the urethane pre-polymer liquid used as the material component for thermo-setting polyurethane, cross-linking agent, and other additive components as necessary and then discharge the liquid mixture; an external heating device provided above the forming drum, as necessary; a metal endless belt that contacts the outer periphery of the forming drum and rotates in conjunction with the forming drum; an external cooling device provided immediately before the separation part, as necessary; a conveyor (can be cooled) having the part to transfer the band-shaped formed blade material provided horizontally, with one end disposed near a position to remove the band-shaped formed blade material from the forming groove of the forming drum; a cooling device that cools this conveyor, as necessary; and a cutting device that cuts the formed band-shaped blade material to a specified length.

According to the aforementioned manufacturing apparatus, polyurethane liquid is discharged from the pouring ports of multiple mixing and casting machines into the forming groove of the rotating hot forming drum to be heated by the forming drum, and if necessary, polyurethane liquid is heated by an external heating device located above the forming drum. Furthermore, polyurethane liquid is filled into the space (cavity) formed by this forming groove and the metal endless belt, and then heated by the forming drum inside the cavity for a specified period of time to achieve polymerization reaction, in order to continuously form polyurethane elastomer that continues in a band shape having a specified width and thickness (formed blade material, etc.). If necessary, a cooling device is provided immediately before the separation part to provide cooling externally via the metal endless belt, in order to continuously separate the formed material from the forming groove of the forming drum, and the formed synthetic resin of multi-layered band shape that has been removed is transferred on the flat conveyor belt while it is being cooled by means of heat radiation. On the other hand, the conveyor belt whose temperature rises due to absorption of heat from the formed product is cooled by a cooling device, if necessary. This way, the band-shaped formed synthetic resin is cooled to near normal temperature and cures/stabilizes. In this condition, the resin is continuously cut by the cutting device to the specified length of a blade or other product, to provide a finished elastic rubber member for blade which is made of thermo-setting polyurethane and has the specified width, thickness and length.

If cutting operation is performed after stopping the transfer, intermittent transfers occur. In this case, a feed roll for intermittent drive and a slack part to give an extra slack in the band-shaped development blade material are formed before the cutting device, and the device is configured in such a way that cutting operation and feed operation are synchronized in order to adjust the transfer timing. By using ceramic cutting blades that slide favorably on polyurethane, cutting can be performed continuously for a long period of time by maintaining sharpness of the cut face.

3-1-2-1. Components of Apparatus

The continuous forming apparatus for multi-layer blade material is explained based on FIGS. 4 to 9.

FIG. 4 is an overview that illustrates an example of a blade material manufacturing apparatus in a schematic manner. FIG. 5 is a drawing showing the forming device part. FIG. 6 is a schematic view of a forming drum, provided for the purpose of explanation of curing behavior of synthetic resin. FIG. 7 is a drawing showing a synthetic resin curing process. FIGS. 8 and 9 are schematic views showing a forming drum and forming of band-shaped blade material, respectively.

As shown in FIG. 4, this manufacturing apparatus for blade material, which is an elastic rubber member, comprises a forming drum 13, first casting-machine mixing head 11 having a supply port to supply resin, second casting machine, endless belt with a mirror surface made of steel 14, cooling conveyor 20, cutting device 24, and transfer conveyor 25, among others.

The pouring port of the first casting-machine mixing head 11 through which polyurethane resin liquid is poured is provided roughly at the 10 o'clock position from the apex of the forming drum 13, while the pouring port of the second casting-machine mixing head 12 is provided near the apex of the forming drum 13, with both pouring ports facing the forming groove, respectively. Provided after these pouring ports is the endless belt 14 that contacts the outer periphery of the forming drum and covers approx. one half the outer periphery, after which transferring of the separated band-shaped blade material 101 under cooling, the cutting device for cutting the material to a specified dimension, and the transfer device are provided, in this order, according to the processes.

An external heating device can also be added between the second casting machine 12 and endless belt 14, or between the first casting machine and second casting machine. Also, a cooling device that cools the endless belt 14 can be added in a position immediately before separation. Although two casting machines are shown in this example, their quantity can be increased according to the layer structure, in which case the positions of supply ports can be moved roughly between the 9 o'clock and 2 o'clock positions.

The forming drum 13 is made of hard aluminum or stainless steel, for example, and has a rotary drive mechanism, forming groove and built-in heating equipment.

The forming groove 30 is formed all around the forming drum on its outer periphery where, to be specific, a groove having a concaved cross-section of the specified dimensions corresponding to the width and thickness of blade material is engraved. This forming groove 30 corresponds to dies. Also, the forming drum has a built-in heating means for supplying enough heat to cure polyurethane or other resin in the forming groove 30. This heating means may be an electric heater, heating oil, steam, etc., and is not specifically limited. The heating temperature of this heating means is determined as deemed appropriate according to the resin used, rotating speed, and so on. For example, it can be set in a range of 110 to 150° C. The rotary drive is rotatably supported by a horizontal rotary axis 15, and is rotated at the specified speed by the drive unit not shown. The rotating direction is set as the clockwise direction in the figure.

The casting machine that supplies each resin mixes the resin components used and then continuously supplies a specified amount of the prepared resin from the pouring port into the forming groove 30 of the forming drum 13.

If an external heating device is provided, it irradiates heat onto, and thereby heats, the resin that has bee poured into the forming groove 30 from the pouring port. This heat promotes curing of resin on the surface side. Curing of poured resin is promoted due to the heat from the forming drum 13 as well as heat from the outside. As a result, viscosity increases and it becomes possible to control the flow of resin into the initial contact end of the endless belt 14. The external heating means may be a non-contact type using infrared light, laser beam, UV light or induction heating, among others. The heating temperature is adjusted and changed according to the resin used, production speed, blade thickness, etc. The heating conditions can also be adjusted by adjusting the output or distance to the groove. Based on the relationship with the resin used, curing can also be promoted by irradiating UV light, if a resin to which UV hardener has been added is used. It is possible to increase the blade thickness, or raise the forming speed, by means of external heating.

The metal endless belt 14 is structured in such a way that it covers the forming groove 30 to create a space in which polyurethane liquid is filled. The endless belt 14 and forming groove 30 create a forming cavity inside which curing reaction of resin progresses in a manner where the outline of blade material is shaped. The section where the endless belt 14 covers the forming groove 30 of the forming drum 13 needs to be designed in such a way that, as the curing of resin progresses, the band-shaped blade material 101 can be separated and removed from the forming groove 30. For example, a 180° range corresponding to the section between the 2 o'clock and 8 o'clock positions ensures easy operation.

A cooling device that blows cool air, etc., from outside of the endless belt 14 to achieve cooling is provided immediately before separation, as necessary.

The cooling conveyor 20 is used to transfer to the next process, under cooling, the formed band-shaped resin blade material 101 that has been separated from the forming groove of the forming drum 13. Additionally, this cooling conveyor may not require cooling at all, depending on the blade material, and if cooling is not required this conveyor may be used simply as a device to transfer to the next process or even omitted entirely.

The cutting device 24 cuts the continuous band-shaped material to blade lengths. Cutting action by this device forms the blade material into the final elastic rubber shape. Thereafter, shaped products are transferred to the process of attaching a metal blade support. To synchronize feed with the operation of this cutting device, a feed roll 23 that controls feed is provided immediately before the cutting device 24, and a space to slacken the tape is provided before the feed roll 23, in order to adjust the timings of the cooling conveyor 20 and cutting device 24.

Furthermore, a heating process where secondary cross-linking is performed to finally implement curing reaction can be added as a subsequent process, if necessary.

Next, an example of the configuration of each part of the apparatus is explained further.

The endless belt 14 that creates a forming space (dies), constituted by a band plate having a mirror surface made of stainless steel, etc., contacts roughly one half the outer periphery of the forming drum 13, where this endless belt 14 is passed over a pre-heating roll 16 that pre-heats this endless belt 14, guide roll 17 that adjusts the traveling of the belt, tension roll 18 that adds tension to the endless belt, and cooling roll 19 that cools the endless belt 14, and rotates in conjunction with the rotation of the forming drum. Also, the endless belt 14 is heated to a specified temperature (such as around 145° C. equivalent to the temperature of the forming drum) by a heater, and this temperature prevents drop in the temperature of polyurethane liquid.

The cooling conveyor 20 having the cooling device 21 provided underneath is installed horizontally next to the cooling roll 19, in order to transfer the band-shaped blade material 101 under cooling.

Provided downstream of and adjoining the cooling conveyor 20 are the slack detector 22, feed roll 23, cutting device 24 and conveyor 25, in this order. The slack detector 22 comprises a pair of top/bottom sensors installed on a pair of support columns erected vertically, where the formed band-shaped blade material is guided between the two sensors to detect a condition of slack in the material.

The feed roller 23 operates in conjunction with the cutting device 24 to create slack, and upon receiving a signal from the detector 22 it feeds the band-shaped blade material to the cutting device 24 at a specified speed so as to cut the band-shaped blade material to a specified length. The conveyor 25 transfers the cut blade materials to the subsequent processes (cross-linking process, metal part bonding process, inspection process, etc.).

The manufacturing apparatus for elastic rubber for blade, described in this example, is configured in the manner explained above. Next, the process for manufacturing a blade for an electro-photographic device using this manufacturing apparatus is explained.

FIGS. 8 and 9 show an overview of basic manufacturing steps using a forming drum. Using the forming drum 13 which has the forming groove 30 provided on its outer periphery and rotates around the horizontal rotary axis 15, thermosetting synthetic resin liquid is supplied continuously into the forming groove from near the apex of the forming drum through the pouring port of the casting machine, by a specified amount just enough to fill the cross-section of the forming groove. Thereafter, the drum rotates with the endless belt (not shown) covering the open surface of the groove and therefore curing and polymerization of synthetic resin progresses. In the location where the resin has cured sufficiently to a level allowing for removal as a tape, the band-shaped blade material is separated and removed from the forming groove to obtain a continuous band-shaped material.

If a two-layer elastic rubber member is to be created, according to an embodiment of the present invention, two casting machines are provided and installed at front and rear positions, where each casting machine measures the applicable pre-polymer and cross-linking agent and agitates/mixes them uniformly to sequentially discharge the polyurethane liquid from the pouring port into the forming groove of the forming drum 13 whose temperature has been adjusted to a specified temperature such as 145° C. for casting. At this time, the forming drum 13 is rotating in the clockwise direction at a specified speed (such as 80 seconds per rotation), and the necessary amount corresponding to the peripheral speed of the forming drum 13 and engraved depth and width of the forming groove 30 is continuously poured, where the groove is filled in such a way that the resin poured first is covered by the resin poured later to form layers.

The process for forming a partial two-layer structure is explained schematically using FIGS. 6 and 7.

In the example shown in FIG. 6, the polyurethane liquid that forms the partial layer is supplied from above the forming drum 13 through a pouring port 11a of the first casting machine 11 positioned at point A shown at the 10:30 position in the figure, while the polyurethane liquid that forms the base layer is supplied from a pouring port 12a of the second casting machine 12 positioned at point C almost directly above the forming drum 13. These materials receive heat from the forming drum and gradually cure, and after arriving at point F where contact with the endless belt starts, they are heated and retained in a condition covered by the endless belt, until point G. This way, the urethane polymerization reaction of liquids is roughly completed and a blade material of the required width and thickness and having two partial layers is formed continuously in a band shape.

The position of each pouring port is adjusted according to the layer structure, resin type, blade thickness, production speed, and so on. In this example, the pouring port positions are adjusted roughly between the 9 o'clock and 2 o'clock positions in the direction opposite the rotation of the forming drum. Desirably, the pouring ports are installed slightly to the left near the 10 o'clock position and 12 o'clock position.

The forming process from point A of the first casting machine to point F where covering by the endless belt starts is explained schematically using FIG. 7. In the example shown here, a partial layer 1 is formed in a streak pattern in the middle of the elastic rubber member surface. Also note that the cured condition of pored synthetic resin is shown by hatched lines, with the part not yet cured shown by white. Note, however, that this condition of progress of curing is only an illustration. Because curing is promoted from the parts contacting the bottom and wall of the heated forming groove, and also because the endless belt is heated as well, curing is promoted also on the open side of the groove due to contact.

First at point A, the resin liquid corresponding to the partial layer 1 is poured from the first pouring port 11a into the forming groove. In this example, a specified amount enough to create a streak is supplied continuously. This initiates polymerization of the resin which is contacting the bottom of the forming groove that has been heated to a temperature suitable for polymerization, and at point B the resin on the bottom side of the groove starts curing. At point C, the resin that forms the base layer 2 is supplied continuously from the second pouring port 12a by an amount enough to fill the remaining cross-section of the forming groove. At point D, curing is promoted from the parts contacting the high-temperature areas of the bottom and wall of the forming groove. At point E immediately before the endless belt makes contact, the resin on the open surface side of the forming groove is fluid and flowing to the downstream side, and accordingly the resin is slightly raised. At point F, contact with the mirror surface of the endless belt which is still hot due to excess heat causes curing of resin to progress also on the surface side. Additionally, although the entire area is hatched at point F, this does not mean polymerization and curing has completed.

Polymerization progresses further between this point F and the removal position (shown in FIG. 4), and the resin can be pulled out as a tape.

Take note that polymerization on the surface side can be promoted by providing an external heating device near point B or point D. Also, ease of separation from the forming groove can be improved by providing an air-cooling fan or other cooling device immediately before point G. If any die release agent, surface treatment agent or other additive agent is to be supplied continuously, a corresponding feeding device can be provided between points G and A.

Thus formed continuous band-shaped blade material is separated from the forming groove 30 of the forming drum 13 at point G and guided onto the endless conveyor belt which corresponds to the cooling conveyor 20.

Take note that, although the cross-section of the forming groove shown in the example of FIG. 7 has a flat bottom, the cross-section of the forming groove is not at all limited to this shape and, when forming an elastic rubber member having a varying cross-section with the thickness changing in the middle, a height difference is also provided in the forming cross-section shape. In addition, if the partial layer is to be made slightly projecting, the layer depth of the applicable part can be increased. When the bottom of the groove is made rough, the formed blade material will have rough surface, which is suitable for charged blades for use with toner of fine spherical grains.

Since the endless conveyor belt is cooled by the cooling device 21, the charged blade material 101 is cooled to near normal temperature (around 20° C.) on the endless conveyor belt and transferred in this manner. As mentioned earlier, the cooling conveyor need not be actively cooled depending on the blade type. In this case, the band-shaped blade material is allowed to discharge heat naturally while being transferred on the cooling conveyor 20.

Then, the cooled band-shaped blade material is guided from the cooling conveyor 20 to the slack detector 22, feed roll 23, cutting device 24, and conveyor 25. The slack detector 22 guides the band-shaped blade material to the feed roll 23 through the space between the two sensors installed on the support columns. Since the feed roll 23 travels faster than the cooling conveyor 20 in a manner sandwiching the band-shaped blade material, it stops when the band-shaped blade material contacts the top sensor 26, and starts feeding when the material contacts the bottom sensor 27, and this way the production speed of band-shaped blade material and processing speed of the cutting device 24 are adjusted (so as not to apply excessive tension to the band-shaped blade material). The cutting device 24 guides the blade material between the top and bottom cutting blades for cutting to a specified length (product length). This completes the process for manufacturing a flat elastic rubber member for blade which is now cut to a specified length.

The cutting device is not at all limited to the configuration based on top/bottom cutting blades, and it can also be configured using a table and a top cutting blade. The tape that has been placed onto the table from the feed roll can be held and in this condition the cutting blade is applied to cut the tape to a specified length.

Thus produced elastic rubber member for blade is then bonded on one side edge to one side edge of a metal support member 4, as shown in FIG. 2, to complete the final product such as a cleaning blade.

According to the present invention, cleaning blades, etc., are produced continuously one by one, unlike the case where the conventional centrifugal forming method is used. Accordingly, cleaning blades can be processed individually in the subsequent processes such as the process of bonding with a holder, and this facilitates automation of these processes. Any method where dies are used is invariably subject to burrs, and therefore the ridgeline at the tip of the blade needs to be cut and shaped. This produces scraps due to cut burrs and therefore increases the amount of wasted resin material.

3-2. Split-Die Forming Method

Under the split-die forming method, two die members for forming a cavity corresponding to the size of one polyurethane elastic blade are put together, after which liquid polyurethane material is poured into the cavity and then polymerized/cured and removed from the dies. Before the dies were assembled, the inventor of the present invention coated over the wall of one split die, in a streak pattern, the liquid ester polyurethane material used for forming the edge or nip, and then cured it halfway. Next, the dies were assembled and the ether polyurethane material used for forming the base was poured in and cured to obtain a blade material with two partial layers.

To form two partial layers using split dies under this method, the means disclosed in Japanese Patent Application No. 2005-357859 filed earlier by the applicant for the present invention can be used.

This is explained below.

The head that discharges a liquid synthetic resin (thermo-setting resin) to the position corresponding to the partial layer is moved, or the dies are moved, to apply the thermo-setting resin in a bead form, after which the split dies are assembled and the thermo-setting resin to become the base is poured and formed integrally with the other resin in a heating oven. The integrally formed blade material is then removed by disassembling the split dies, after which the material is cut to a specified size and the cut material is used as a blade. The blade rubber member can be integrally bonded with the support by setting a part of the support inside the cavity when assembling the dies and then pouring the base forming resin in this condition.

<Process>

The blade manufacturing method conforming to the present invention is a die-recyclable process as described below. This process is illustrated in FIG. 13.

First, the dies are cleaned and die release agent is applied onto the surface of the areas to be contacted by the thermo-setting resins (A, B). If necessary, a support member made of metal, etc., is affixed to the dies before the partial layer resin is applied (C). At this time, a support member detection device to detect whether or not the support member metal has been inserted into the specified position can be provided, if necessary, by considering the continuous manufacturing of blade materials. Next, the thermo-setting resin liquid corresponding to the bead or other partial layer is applied onto the surface of one split die from the discharge head of synthetic resin liquid (D). Thereafter, the split dies for blade shape are assembled (E) and the thermo-setting resin corresponding to the base member is poured (F). Next, these split dies in which the thermo-setting resin liquids have been filled are transferred to the oven used for thermal cross-linking, while at the same time the liquid synthetic resins are heated and cured to integrally form liquid synthetic resins of different compositions (G). The metal support member affixed to the dies is integrally heated and cured with the synthetic resins during this process of heating and curing, after which the split dies are disassembled to remove the blade (H, I). After the blade material has been removed, the dies can be cleaned and used repeatedly by filling liquid synthetic resins again (J), which makes this a recyclable process.

Although the split dies can be cleaned in any way, specific devices that can be used include the one proposed in Japanese Patent Laid-open No. Hei 11-114972, where the dies are placed at the specified position with their cleaning surface facing up, and then a flat brush is caused to contact the top face of the dies and then moved back and forth in the longitudinal direction of the dies in order to clean the surface of the dies. The cleaned die surface may be coated with die release agent to facilitate separation of thermo-set synthetic resins from the dies.

<Dies>

FIG. 14 shows a section view illustrating an overview of a split-die structure.

The die 110 comprises left and right split dies 110a, 110b. Formed between the split dies 110a, 110b are projected members that sandwich a core metal AA that will become the support member. These split dies 110a, 110b are provided between a base plate 113 and a side wall 114 and inclined slide wall 115 elected on the left and right sides of this base plate 113, and when a wedge-shaped die-clamping member 116 is pushed in toward the inclined side wall 115, the dies are clamped and assembled. The synthetic resin for the base is poured into the space formed between the two split dies 110a, 110b, to form a blade.

In the example shown in FIG. 14, the core metal AA is placed and heating/forming of resin and bonding of the core metal are performed simultaneously. However, it is possible to form a blade material by curing the resins without placing the core metal AA, and then bond the support member to produce a blade.

FIG. 15 shows the condition where the resin for forming the partial layer is discharged to one of the split dies (110a or 110b) from a discharge head 108 in the longitudinal direction in a bead shape. As for the means for casting the partial layer, one of two methods, or specially the method of moving the discharge head or the method of moving the split die, can be adopted, for example.

FIG. 16 shows an overview of the discharge-head moving method.

This device 111 that pours resin into the split dies has a hold screw 118, where a slide plate 112 which is rotated and moved by a drive motor M is installed on the screw. The slide plate 112 is guided by two guide rods. The drive motor M uses a servo motor capable of switching the rotating direction between forward and backward and controlling the rotating speed, where the control itself is implemented by a computer by installing limit switches, etc.

Under the method in which the discharge head 108 is moved, the discharge head 108 is connected to the slide plate 112. Under the method in which the split die 110a is moved, the split die 110a (or 110b) is connected to the slide plate 112. Thereafter, the dies are assembled, as shown in FIG. 14, and the base resin is poured from above, after which the resin is heated and cured to achieve forming. The obtained blade resin material is suitable as a blade material for an electro-photographic device.

Any thermo-setting synthetic resin is suitable as the liquid synthetic resin to be used here, and for example any thermo-setting polyurethane resin can be used. A resin whose composition is arranged for the required hardness, elasticity and other physical properties should be used. In addition, additive agents can also be added.

The cleaning blade or other product formed by the split-die forming method is integrally formed with the elastic rubber member 3 bonded to one tip of the support member 4 made of metal, etc. FIG. 17 is a perspective view of a cleaning blade formed by the split-die forming method, while FIG. 18 is its section view. This example shows a multi-layer elastic rubber member 3 whose edge part 1 that scrapes off toner by rubbing motion has a separate composition from the base member 2. The cleaning blades shown in FIGS. 17 and 18 have a part of the support member 4 biting into and thereby bonding with the elastic rubber member 3. This example shows a multi-layer elastic rubber member whose edge part 1 that scrapes off toner by rubbing motion has a separate composition from the base member 2.

3-3. Centrifugal Forming Method

Under the centrifugal forming method, two types of polyurethane materials are poured separately into the front and rear sections inside the rotary drum, in order to obtain a wide polyurethane sheet on which two or more layers are formed, after which this sheet is cut to the size of an individual blade.

EXAMPLE

Cleaning blades or development blades were manufactured under the following conditions in the respective Examples and Comparative Examples.

For the manufacturing means, the method of continuous forming using a rotary forming drum with a groove formed on its outer periphery was used. Refer to FIG. 4 for the manufacturing apparatus.

<Cleaning Blade, Development Blade>

Polyurethane elastic rubber member: The thickness was 2.0 mm. The thickness of the edge layer (or nip layer) was 0.3 mm, while that of the base layer was 1.7 mm. The width and length were adjusted to an actual machine used in the test.

Metal support: Steel sheet of 1.2 mm in thickness

Bonding process: The above elastic rubber member and metal support were melt-bonded using hot-melt adhesive based on dimer acid.

<Thermo-Setting Polyurethanes>

The blends of ester urethanes and ether urethanes used for the edge (nip) layer and base layer are shown in each table.

<Evaluation Test>

The cleaning blade or development blade obtained from each Example or Comparative Example was set in a development apparatus with integrated cartridge using one-component magnetic toner of 8 μm in average grain size (laser beam printer IPSiO NX700 by Ricoh Co., Ltd.), to check the image irregularity based on 50% grayscale image. The amount of electricity charged to toner was evaluated using a suction-type toner charge measuring machine. In the printing test using an actual machine, a blade that had been exposed for 14 days to an environment of 43° C. and 95% humidity was set in an actual machine and tested. Also, up to 40 k sheets (1 set=1 k=1,000 sheets) of character chart images were printed to observe the printing condition.

Examples 1 to 4

Tables 1 to 3 show the details of Examples 1 to 4 and Comparative Examples 1 to 4.

Table 1 shows the polyurethane compositions. Table 2 shows the physical properties and printing test results of Examples 1 to 3 and Comparative Examples 1 and 2 relating to cleaning blades. Table 3 shows the physical properties and printing test results of Example 4 and Comparative Examples 3 and 4 relating to development blades. The blades were tested in an actual machine after having been exposed for 14 days to a temperature of 43° C. and humidity of 95% following their forming. The physical properties represent those of polyurethanes before the test when the polyurethanes had been left for at least 7 days at room temperature following their forming and thus their physical properties were stable.

TABLE 1

Blends of Examples 1 to 4 and Comparative Examples 1 to 4
In parts by weight

| | | Ester type | | Ether type | |
|---|---|---|---|---|---|
| | Material | Blend A (Hardness: 65) | Blend B (Hardness: 77) | Blend C (Hardness: 65) | Blend D (Hardness: 77) |
| Base resin | MDI | 100.0 | 100.0 | 100.0 | 100.0 |
| Hardener | PBA2000 | 255.0 | 215.0 | — | — |
| | PTMG2000 | — | — | 247.0 | 209.0 |
| | BD | 13.80 | 19.04 | 13.50 | 18.68 |
| | TMP | 9.17 | 4.76 | 8.97 | 4.67 |

Note Sources of materials
MDI: Millionate MT by Nippon Polyurethane Industry Co., Ltd.
PBA2000: Nippollan 4010 by Nippon Polyurethane Industry Co., Ltd.
PTMG2000: PTG-2000SN by Hodogaya Chemical Co., Ltd.
BD: 1,4-butane diol by Mitsubishi Chemical Corporation
TMP: Trimethylol propane by Mitsubishi Gas Chemical Co., Inc.

TABLE 2

| | | | Cleaning blade | | | | |
|---|---|---|---|---|---|---|---|
| | | | Example 1 | Example 2 | Example 3 | Comparative Example 1 | Comparative Example 2 |
| Edge layer | Material | | Ester type Blend B | Ester type Blend B | Ester type Blend A | Ester type Blend B | Ether type Blend D |
| | Hardness (JIS-A) | | 77 | 76 | 65 | 77 | 77 |
| | Impact resilience (%, at 23° C.) | | 35 | 35 | 36 | 36 | 45 |
| | Permanent elongation (%, 200% | | 3.5 | 3.4 | 0.9 | 3.5 | 1.9 |

TABLE 2-continued

Cleaning blade

|  |  |  | Example 1 | Example 2 | Example 3 | Comparative Example 1 | Comparative Example 2 |
|---|---|---|---|---|---|---|---|
| Base layer |  | elongation) |  |  |  |  |  |
|  |  | Thickness (a) (mm) | 0.3 | 0.3 | 0.3 | 0.3 | 0.3 |
|  |  | Material | Ether type Blend C | Ether type Blend D | Ether type Blend C | Ester type Blend A | Ester type Blend A |
|  |  | Hardness (JIS-A) | 65 | 78 | 65 | 64 | 65 |
|  |  | Impact resilience (%, at 23° C.) | 44 | 45 | 45 | 36 | 35 |
|  |  | Permanent elongation (%, 200% elongation) | 0.4 | 2.0 | 0.5 | 0.9 | 0.9 |
|  |  | Thickness (b) (mm) | 1.7 | 1.7 | 1.7 | 1.7 | 1.7 |
| Printing test | 23° C. | Number of sheets printed (in units of 1,000 sheets (1k)) | 40k | 40k | 40k | 8k | 4k |
|  |  | Pass-through of toner | None | None | None | Occurred due to drop in contact force. | Occurred due to worn edge. |
|  | 10° C. | Number of sheets printed (in units of 1,000 sheets (1k)) | 40k | 40k | 40k | 1k | 9k |
|  |  | Pass-through of toner | None | None | None | Occurred due to drop in contact force. | Occurred due to worn edge. |

In the printing test, blades that had been exposed for 14 days to an environment of 43° C. and 95% humidity were set in an actual machine and tested.

TABLE 3

|  | Development Blade | Example 4 | Comparative Example 3 | Comparative Example 4 |
|---|---|---|---|---|
| Edge layer | Material | Ester type Blend A | Ester type Blend A | Ether type Blend C |
|  | Hardness (JIS-A) | 65 | 65 | 65 |
|  | Impact resilience (%, at 23° C.) | 34 | 36 | 45 |
|  | Permanent elongation (%, 200% elongation) | 0.8 | 0.9 | 0.4 |
|  | Thickness (a) (mm) | 0.3 | 0.3 | 0.3 |
| Base layer | Material | Ether type Blend C | Ester type Blend A | Ester type Blend A |
|  | Hardness (JIS-A) | 65 | 64 | 65 |
|  | Impact resilience (%, at 23° C.) | 44 | 36 | 35 |
|  | Permanent elongation (%, 200% elongation) | 0.4 | 0.9 | 0.9 |
|  | Thickness (b) (mm) | 1.7 | 1.7 | 1.7 |
| Printing test | 23° C. Number of sheets printed (in units of 1,000 sheets (1k)) | 40k | 12k | 5k |
|  | Image abnormality | None | White spot occurred due to drop in contact force. | White spot occurred due to drop in contact force. |
|  | 10° C. Number of sheets printed (in units of 1,000 sheets (1k)) | 40k | 1k | 10k |
|  | Image abnormality | None | White spot occurred due to drop in contact force. | White spot occurred due to drop in contact force. |

In the printing test, blades that had been exposed for 14 days to an environment of 43° C. and 95% humidity were set in an actual machine and tested.

The cleaning blades and development blades obtained in Examples 1 to 4, whose edge layer was made of ester urethane and base layer of ether urethane, demonstrated good printing results. In the case of Comparative Example 3 where the edge layer and base layer were both made of ester urethane, printing problems occurred and there problems are likely due to a drop in contact force caused by promotion of hydrolysis, which in turn resulted from exposure to high temperature and high humidity for 14 days. Comparative Examples 2 and 4, where the edge layer was made of ether urethane and the base layer of ester urethane, resulted in printing problems caused by progression of wear at the edge due to use of ether urethane whose wear resistance is low.

Examples 5 to 13

Table 4 shows the urethane blends, physical properties and evaluation test results of the cleaning blades obtained by Examples 5 to 13 and Comparative Examples 5.

The blades were tested in an actual machine after having been exposed for 14 days to a temperature of 43° C. and humidity of 95% following their forming. As is the case with Table 2, the physical properties represent those of polyurethanes before the test when their physical properties were stable.

TABLE 4

Example of cleaning blade

Blend for edge (Common to all examples)

| Material | | Parts by weight |
|---|---|---|
| Base resin | MDI | 28.8 |
| Hardener | PBA2000 | 64.9 |
| | BD | 4.4 |
| | TMP | 1.9 |
| Hardness | | 74.0 |
| Impact resilience at 0° C. | | 14 |
| Impact resilience at 23° C. | | 25 |
| Impact resilience at 50° C. | | 66 |
| Tanδ peak temperature | | 7.0 |

Blend for base (parts by weight)

| Material | | Example 5 | Example 6 | Example 7 | Example 8 | Example 9 | Example 10 | Example 11 | Example 12 | Example 13 | Comparative Example 5 |
|---|---|---|---|---|---|---|---|---|---|---|---|
| Base resin | MDI | 34.3 | 34.3 | 34.3 | 33.3 | 36.1 | 32.3 | 37.1 | 32.3 | 36.1 | 28.8 |
| Hardener | PPG1000 | 59.2 | 59.2 | 59.2 | 60.6 | 56.4 | 62.0 | 55.1 | 62.0 | 56.4 | |
| | PBA2000 | | | | | | | | | | 64.9 |
| | BD | 3.9 | 4.7 | 5.6 | 4.9 | 4.5 | 4.8 | 4.7 | 3.4 | 6.3 | 4.4 |
| | TMP | 2.6 | 1.8 | 1.0 | 1.2 | 3.0 | 0.8 | 3.1 | 2.3 | 1.1 | 1.9 |
| Hardness | | 60.0 | 72.0 | 85.0 | 72.0 | 72.0 | 72.0 | 74.0 | 58.0 | 87.0 | 74.0 |
| Impact resilience at 0° C. | | 65 | 68 | 70 | 70 | 64 | 72.0 | 62.0 | 67.0 | 69.0 | 14 |
| Impact resilience at 23° C. | | 67 | 70 | 71 | 71 | 66 | 73.0 | 64.0 | 69.0 | 70.0 | 25 |
| Impact resilience at 50° C. | | 71 | 72 | 73 | 74 | 69 | 76.0 | 67.0 | 71.0 | 73.0 | 66 |
| Rate of change in impact resilience (c − a) | | 6 | 4 | 3 | 4 | 5 | 4.0 | 5.0 | 4.0 | 4.0 | 52 |
| Tanδ peak temperature | | −4.0 | −15.0 | −26.0 | −30.0 | 0.0 | −34.0 | 6.0 | −12.0 | −18.0 | 7.0 |
| Evaluation result in actual machine (Number of sheets printed (in units of 1,000 sheets (1k)) | 5° C. | 40k | 40k | 40k | 40k | 40k | 40k | Δ slight pass-through of toner occurred from the initial state. | — | — | x Significant pass-through of toner occurred from the initial state. |
| | 23° C. | 40k | 40k | 40k | 40k | 40k | 40k | 40k | Δ Pass-through of toner occurred from the initial state. | Δ Chipping occurred after 10k. Toner streaks also occurred. | 40k |
| | 35° C. | 40k | 40k | 40k | 40k | 40k | Δ Abnormal noises occurred from the initial state. | 40k | — | — | 40k |

MDI: Millionate MT by Nippon Polyurethane Industry Co., Ltd.
PPG1000: Excenol 1020 by Asahi Glass Co., Ltd.
PBA2000: Nippollan 4010 by Nippon Polyurethane Industry Co., Ltd.
BD: 1,4-butane diol by Mitsubishi Chemical Co., Inc.
TMP: Trimethylol propane by Mitsubishi Gas Chemical Corporation
Note:
PPG 1000 --- Ether type
Note:
PBA2000 --- Ester type The cleaning blades obtained in Examples 5 to 13, whose edge layer was made of ester urethane and base layer of ether urethane, demonstrated good printing results. It was confirmed that these two-layer blades for an electro-photographic device were subject to minimum permanent deformation and offered excellent mechanical strength and wear resistance. It was confirmed that these blades were subject to minimum permanent deformation, offered excellent mechanical strength and wear resistance, had low temperature dependence of visco-elasticity and their hardness (pressure contact force of blade) was in an appropriate range (=blades that can perform cleaning even in a low-temperature environment and does not produce abnormal noises in a high-temperature environment). Although it is difficult to achieve a blade suitable for such a wide range of applications by using a single material, the blades conforming to the present invention solved this problem through use of ester polyurethane for the edge or nip and ether polyurethane for the base.

In particular, the JIS-A hardness of the ether urethane used for the base layer has been confirmed good, in a range of 60 to 85. The tan δ peak temperature was particularly good in a range of −33 to 0° C. In terms of impact resilience, the difference in impact resilience between 0° C. and 50° C. was 10% or less in each Example.

In Comparative Example 5, where both the edge layer and base layer were made of ester urethane, the printing results at low temperature were poor from the beginning and low-temperature characteristics were bad. It is assumed that the cause of these poor results is the low impact resilience at low temperature. In Examples 12 and 13, the results at normal temperature were slightly unfavorable, where these results were likely influenced by the low JIS-A hardness of 58 and high JIS-A hardness of 87, respectively. Similarly, Examples 10 and 11 were likely influenced by the low tan δ peak temperature of −34° C. and high tan δ peak temperature of 6° C., respectively.

Examples 14 to 22

Table 5 shows the urethane blends, physical properties and evaluation test results of the cleaning blades obtained by Examples 14 to 22 and Comparative Example 5.

In addition to the evaluation tests shown in Table 4, each cleaning blade was also assembled into an actual machine and then stored for 30 days in an atmosphere of 40° C. and 95% humidity and then evaluated at normal temperature (23° C.).

The blades were exposed for 14 days to a temperature of 43° C. and humidity of 95% following their forming, and then tested. As is the case with Table 2, the physical properties represent those of polyurethanes before the test when their physical properties were stable.

TABLE 5

Example of cleaning blade

Blend for edge (Common to all examples)

| | Material | Parts by weight |
|---|---|---|
| Base resin | MDI | 28.8 |
| Hardener | PBA2000 | 64.9 |
| | BD | 4.4 |
| | TMP | 1.9 |
| Hardness | | 74.0 |
| Impact resilience at 0° C. | | 14 |
| Impact resilience at 23° C. | | 25 |
| Impact resilience at 50° C. | | 66 |
| Permanent elongation | | 0.5 |
| Tanδ peak temperature | | 7.0 |

Blend for base (parts by weight)

| | Material | | Example 14 | Example 15 | Example 16 | Example 17 | Example 18 | Example 19 | Example 20 | Example 21 | Example 22 | Comparative Example 5 |
|---|---|---|---|---|---|---|---|---|---|---|---|---|
| Base resin | MDI | | 24.3 | 24.3 | 24.3 | 19.7 | 28.8 | 18.5 | 30.9 | 18.5 | 30.9 | 28.8 |
| Hardener | PTM2000 | | 70.5 | 70.5 | 70.5 | 76.9 | 64.2 | 78.6 | 61.2 | 78.6 | 61.2 | |
| | PBA2000 | | | | | | | | | | | 64.9 |
| | BD | | 3.1 | 3.8 | 4.4 | 2.7 | 4.2 | 2.5 | 4.7 | 1.7 | 6.7 | 4.4 |
| | TMP | | 2.1 | 1.4 | 0.8 | 0.7 | 2.8 | 0.4 | 3.2 | 1.2 | 1.2 | 1.9 |
| Hardness | | | 63.0 | 72.0 | 84.0 | 72.0 | 72.0 | 72.0 | 62.0 | 59.0 | 87.0 | 74.0 |
| Impact resilience at 0° C. | | | 65 | 68 | 70 | 70 | 64 | 72.0 | 62.0 | 67.0 | 69.0 | 14 |
| Impact resilience at 23° C. | | | 67 | 70 | 71 | 71 | 66 | 73.0 | 64.0 | 69.0 | 70.0 | 25 |
| Impact resilience at 50° C. | | | 71 | 72 | 73 | 74 | 69 | 76.0 | 67.0 | 71.0 | 73.0 | 66 |
| Rate of change in impact resilience (c − a) | | | 6 | 4 | 3 | 4 | 5 | 4.0 | 5.0 | 4.0 | 4.0 | 52 |
| Tanδ peak temperature | | | −4.0 | −18.0 | −26.0 | −30.0 | 0.0 | −34.0 | 6.0 | −12.0 | −18.0 | 7.0 |
| Evaluation result in actual machine (Number of sheets printed (in units of 1,000 sheets (1k)) | | 5° C. | 40k | 40k | 40k | 40k | 40k | 40k | Δ slight pass-through of toner occurred from the initial state. | — | — | x Significant pass-through of toner occurred from the initial state. |
| | | 23° C. | 40k | 40k | 40k | 40k | 40k | 40k | 40k | Δ slight pass-through of toner occurred from the initial state.. | Δ Chipping occurred after 10k. Toner streaks also occurred. | 40k |
| | | 35° C. | 40k | 40k | 40k | 40k | 40k | Δ Abnormal noises occurred form the initial state. | 40k | — | — | 40k |

TABLE 5-continued

| | Example of cleaning blade | | | | | | | | | |
|---|---|---|---|---|---|---|---|---|---|---|
| Assembled and stored for 30 days in atmosphere of 40° C. × 95% RH and then evaluated in actual machine at 23° C. | 40k | 40k | 40k | 40k | 40k | 40k | 40k | — | — | 40k |

MDI: Millionate MT by Nippon Polyurethane Industry Co., Ltd.
PTMG2000: PTG-2000SN by Hodogaya Chemical Co., Ltd.
PBA2000: Nippollan 4010 by Nippon Polyurethane Industry Co., Ltd.
BD: 1,4-butane diol by Mitsubishi Chemical Co., Inc.
TMP: Trimethylol propane by Mitsubishi Gas Chemical Corporation
Note:
PPG 1000 --- Ether type
Note:
PBA2000 --- Ester type Trends similar to the results shown in Table 4 were also confirmed from the results in Table 5 above, as Examples 14 to 18 exhibited good printing results at normal temperature even after the blades had been left in high temperature and high humidity for 30 days.

The invention claimed is:

1. A blade for an electro-photographic device comprising an elastic rubber member constituted by an edge portion and a base portion which are in contact with each other and are constituted by different materials, wherein the edge portion includes an edge subject to frictional wear in use and is made of ester polyurethane, and the base portion is adapted to be bonded to a support and is made of ether polyurethane.

2. The blade for an electro-photographic device according to claim 1, wherein the ether polyurethane constituting the base is made of polytetramethylene glycol urethane or polyoxy propylene urethane.

3. The blade for an electro-photographic device according to claim 1, wherein the hardness of the base is 60 to 85 in JIS-A hardness.

4. The blade for an electro-photographic device according to claim 1, wherein the ether polyurethane constituting the base has a rate of change in impact resilience of 10% or less at temperatures of 0° C. to 50° C.

5. The blade for an electro-photographic device according to claim 1, wherein the ether polyurethane constituting the base has a peak tan δ temperature of −33° C. to 0° C. as measured under the following conditions:
Tan δ measurement conditions (temperature variance)
Dynamic strain: 0.1%/Frequency: 10 Hz/Rate of rise in temperature: 2° C./min.

6. The blade for an electro-photographic device according to claim 1, wherein a thickness of the edge portion is 0.1 to 1.0 mm.

7. The blade for an electro-photographic device according to claim 1, wherein a cross section of the edge portion has a circular-arc shape.

8. The blade for an electro-photographic device according to claim 1, wherein said blade for an electro-photographic device is a cleaning blade used to clean residual toner.

9. The blade for an electro-photographic device according to claim 1, wherein said blade for an electro-photographic device is a development blade.

10. A blade for an electro-photographic device comprising an elastic rubber member constituted by a nip portion and a base portion which are in contact with each other and are constituted by different materials, wherein the nip portion includes a nip subject to frictional wear in use and is made of ester polyurethane, and the base portion is adapted to be bonded to a support and is made of ether polyurethane.

11. The blade for an electro-photographic device according to claim 10, wherein the ether polyurethane constituting the base is made of polytetramethylene glycol urethane or polyoxy propylene urethane.

12. The blade for an electro-photographic device according to claim 10, wherein the ether polyurethane constituting the base has a rate of change in impact resilience of 10% or less at temperatures of 0° C. to 50° C.

13. The blade for an electro-photographic device according to claim 10, wherein the ether polyurethane constituting the base has a peak tan δ temperature of −33° C. to 0° C. as measured under the following conditions:
Tan δ measurement conditions (temperature variance)
Dynamic strain: 0.1%/Frequency: 10 Hz/Rate of rise in temperature: 2° C./min.

14. The blade for an electro-photographic device according to claim 10, wherein a thickness of the nip portion is 0.1 to 1.0 mm.

15. The blade for an electro-photographic device according to claim 10, wherein a cross section of the nip portion has a circular-arc shape.

16. The blade for an electro-photographic device according to claim 10, wherein said blade for an electro-photographic device is a cleaning blade used to clean residual toner.

17. The blade for an electro-photographic device according to claim 10, wherein said blade for an electro-photographic device is a development blade.

* * * * *